United States Patent [19]

Mitchell, Jr.

[11] 4,129,940

[45] Dec. 19, 1978

[54] METHODS OF AND APPARATUS FOR ASSEMBLING CONNECTORS WITH A BACK PLATE

[75] Inventor: Henry D. Mitchell, Jr., Winston-Salem, N.C.

[73] Assignee: Western Electric Co., Incorporated, New York, N.Y.

[21] Appl. No.: 829,161

[22] Filed: Aug. 30, 1977

[51] Int. Cl.[2] .............................................. H02G 15/00

[52] U.S. Cl. ........................................ 29/629; 29/759; 29/761

[58] Field of Search .................. 29/629, 759, 761, 592

[56] References Cited

U.S. PATENT DOCUMENTS 3,377,688 4/1968 Beumer ................................. 29/759

3,520,048 7/1970 Esseluhn et al. ......................... 29/592

3,611,561 10/1971 Dosier ..................................... 29/759

*Primary Examiner*—Lowell A. Larson

*Attorney, Agent, or Firm*—J. B. Hoofnagle, Jr.

[57] ABSTRACT

In the assembly of a plurality of connectors with a supporting back plate, the plate is positioned to permit movement of a plurality of connector-receiving nests through openings in the plate. The connectors are then fed from a supply and into a diverging track system to space the connectors in alignment with and to feed them into the nests. The nests are then moved through the plate opening to deposit extended end portions of the connectors onto the plate adjacent to bendable clasps formed integrally with the plate. The clasps are then bent to secure the connectors with the plate.

16 Claims, 15 Drawing Figures

FIG-1
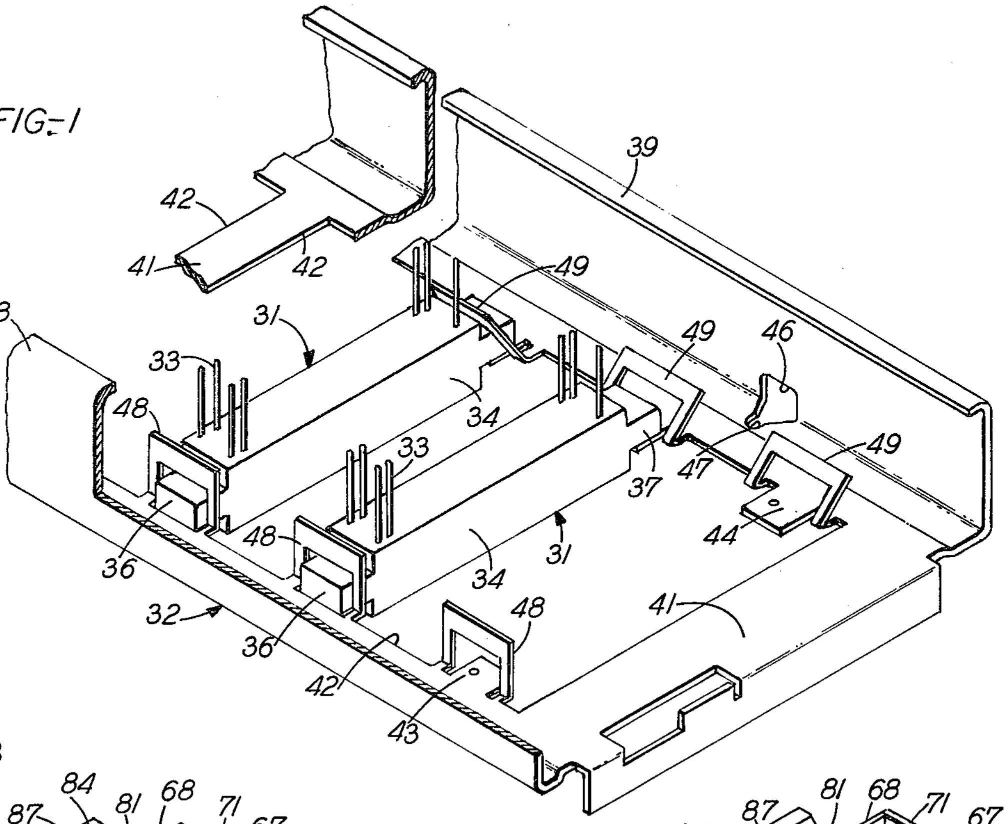
FIG-3
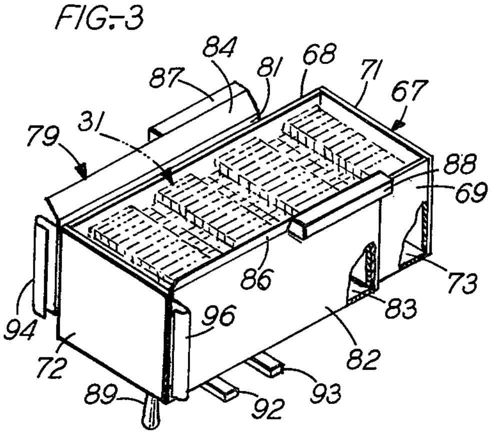
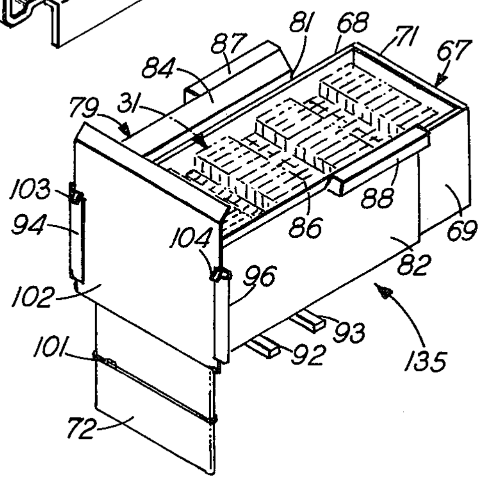
FIG-5
FIG-4
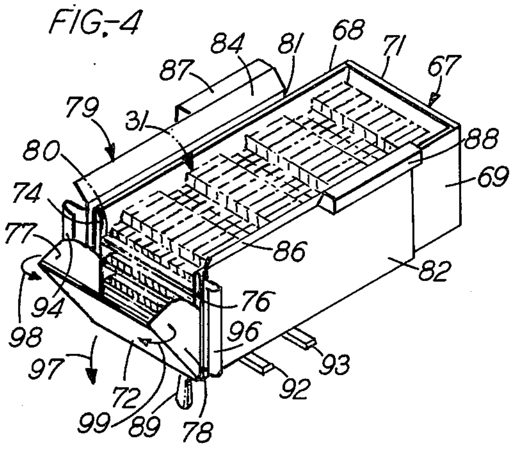
FIG-6
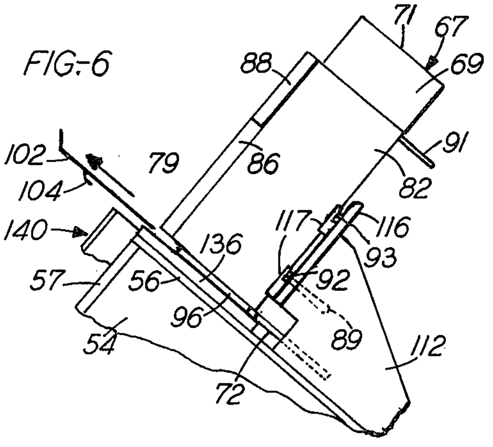

METHODS OF AND APPARATUS FOR ASSEMBLING CONNECTORS WITH A BACK PLATE

BACKGROUND OF THE INVENTION

1. Field of the Invention

This invention relates to methods of and apparatus for assembling connectors with a back plate, and particularly to methods of and apparatus for conveying a plurality of connectors from a supply and into aligned positions on a back plate whereafter the connectors are secured to the back plate.

2. Description of the Prior Art

Communication centers, such as a telephone central office, typically contain bays of equipment used in processing communications signals. In some instances, the bays include frames which extend from floor to ceiling and support a plurality of shelves for receiving and supporting the equipment. Each shelf is usually arranged in a horizontal position and extends rearwardly of the frame to a back plate which is in a vertical position. The back plate provides support for a plurality of connectors adapted on the shelf side for receiving plug-in connection of the equipment and having terminals on the opposite side to facilitate wired connection with external circuits. The connectors are secured to the back plate by a variety of means such as screw fasteners, clips and the like.

Another facility for securing the connectors with the back plate is disclosed in U.S. Pat. No. 4,038,696 which issued on July 26, 1977, in the names of J. O. Etchison, Jr., G. R. Jobe and R. H. W. Jones, Jr. As disclosed in this patent, the back plate is formed integrally with a first plurality of connector-securing enclosures along one edge of a connector-receiving opening of the plate and a second plurality of connector-securing enclosures along the opposite edge of the opening. The first plurality of enclosures are in alignment with the second plurality of enclosures and form spaced sets of two enclosures each. Each enclosure is generally of a U-shaped configuration with the ends of the "U" being integrally linked to the remainder of the back plate. This design provides an opening within the U-shaped configuration for reception of a portion of the connector. Each enclosure of the first plurality extends generally perpendicularly from the back plate while each enclosure of the second plurality extends angularly away from the first plurality and the connector-receiving opening of the back plate. Each aligned set of enclosures, which may also be referred to as clasps, provide facility for securing a connector to the back plate. The connector is formed with a central body section which supports a plurality of terminals. Each end of the connector is formed with a stepped end or flange portion. The enclosure of the clasp is designed dimensionally to accept the stepped end or flange portion.

During assembly of the connector with the back plate, one stepped end portion of the connector is positioned manually into the perpendicularly arranged clasp and the connector is positioned within the connector-receiving opening. The connector then engages stop tabs which preclude the connector from being moved completely through the opening. As the connector is manually positioned within the opening, the other stepped end portion is positioned adjacent to the angularly arranged clasp. Thereafter, the angularly arranged clasp is manually bent over the adjacent stepped end portion. In this manner, the two stepped end portions of the connector are now captured within the openings of the set of two aligned clasps which thereby facilitate securing of the connector with the back plate.

As noted in the aforementioned U.S. Pat. No. 4,038,696, the assembly of the connectors with the back plate is accomplished manually whereby the connectors are assembled one at a time. This results in a time consuming procedure which could be more efficiently and economically accomplished by machine-assisted techniques.

SUMMARY OF THE INVENTION

This invention contemplates a method and an apparatus for assembling a connector with a supporting back plate by moving a connector-receiving nest partially through an opening in the back plate to receive a connector therein. Thereafter the nest is moved back through the opening to position the connector adjacent to a bendable clasp formed with the plate. The clasp is then bent over the adjacent portion of the connector to secure the connector with the plate.

BRIEF DESCRIPTION OF THE DRAWINGS

FIG. 1 is a partial perspective view showing a portion of a support back plate having connectors assembled therewith;

FIG. 3 is a perspective view showing a box-support frame for supporting a box having prearranged layers of rows of connectors to be fed to the apparatus of FIG. 2;

FIG. 4 is a perspective view showing a connector-filled box mounted within the box-support frame of FIG. 3;

FIG. 5 is a perspective view showing an end cover mounted on the box-support frame of FIG. 3;

FIG. 6 is a perspective view showing the box-support frame and supported box mounted on the apparatus of FIG. 2 with the end cover of FIG. 5 removed;

DETAILED DESCRIPTION

General

Figure 2:
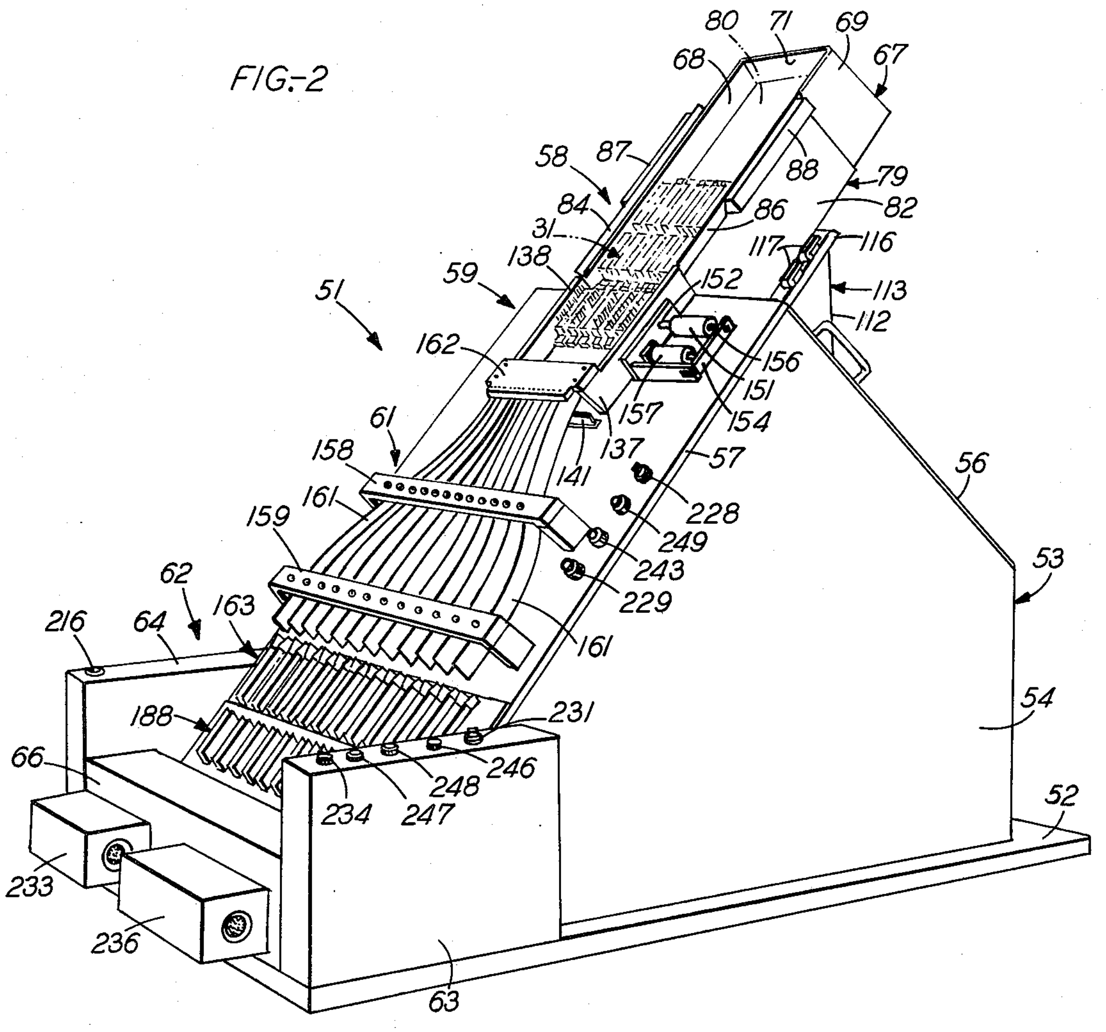
FIG. 2 is a perspective view showing an apparatus for assembling connectors with a support back plate in accordance with certain principles of the invention.

Referring to FIG. 1, there is illustrated a connector, designated generally by the numeral 31, which is assembled with a partially illustrated support back plate, designated generally by the numeral 32. The connector 31 is provided with a plurality of terminals 33 which extend in two parallel rows from one side of a central body portion 34 thereof. Connector 31 is further formed with stepped or flange ends 36 and 37.

The support back plate 32 is formed from flat sheet metal by various stamping and bending operations to form a generally elongated U-shaped channel with spaced-apart elongated side sections 38 and 39 joined at spaced locations by a web 41. The web 41 is formed with three rectangularly shaped openings 42 (one shown), each of which receive four connectors 31. The back plate 32 is formed with a first row of stop tabs 43 along one edge of the opening 42, in the plane of the web 41 and adjacent to the side section 38. A second row of stop tabs 44 is formed along the opposite edge of the back plate opening 42 in the plane of the web 41 adjacent to the side section 39. Each stop tab 43 along one edge of the opening 42 is paired with an aligned one of the tabs 44 along the opposite edge of the opening and ultimately engage the flange ends 36 and 37, respectively, of the associated connector 31 to preclude the connector from passing through the opening.

An opening 46 is formed in a portion of the side section 39 of the back plate 32 and communicates with a keyhole opening 47 formed in the web 41.

A first plurality of connector-securing clasps 48 are spatially formed along one edge of the opening 42 adjacent to the side section 38 and extend generally perpendicularly from the plane of the web 41. A second plurality of connector-securing clasps 49 are spatially formed along the opposite edge of the opening 42 adjacent to the side section 39. Each of the clasps 49 are bent angularly toward the side section 39 thereby forming an acute angle with the plane of the web 41.

Each of the clasps 48 and 49 is formed generally in a U-shaped configuration with the ends of the "U" being integrally formed with the web 41 and located adjacent to one of the stop tabs 43 and 44, respectively. Each of the clasps 48 is paired with one of the clasps 49 to provide facility for securing the connector 31 with the back plate 32.

Additional information relating to the connectors 31 and the back plate 32 appears in the aforementioned U.S. Pat. No. 4,038,696.

As viewed in FIG. 1, there is illustrated three connector-receiving positions in the back plate 32. The rightmost position is empty while the center and leftmost positions have connectors 31 located therein.

When assembling a connector 31 with the back plate 32, the flange end 36 is positioned on the stop tab 43 and moved into the opening formed by the adjacent clasp 48. The opposite end of the connector 31 is then moved until the flange end 37 rests on the stop tab 44 whereby the connector is located essentially in the plane of the web 41. The connector 31 is now assembled with the back plate 32 as illustrated in the center position of FIG. 1.

Thereafter, the associated clasp 49 is bent away from the side section 39 and over the flange end 37 as illustrated in the leftmost position of FIG. 1. The connector 31 is thereby secured with the back plate 32. This assembly operation has been conducted manually as noted in U.S. Pat. No. 4,038,696. However, such a manual technique is time consuming which results in costly inefficiencies. Consequently, there is a need for a mechanical facility to accomplish the assembly and securing of the connector 31 with the back plate 32.

General Apparatus

Referring to FIG. 2, there is illustrated an apparatus, designated generally by the numeral 51, for assembling and securing the connectors 31 (FIG. 1) with the back plate 32. The apparatus 51 includes a base 52 which is mounted on a table (not shown) and which supports a housing, designated generally by the numeral 53. The housing 53 contains and supports facilities for effecting the assembly and securing of the connectors 31 with the back plate 32.

The housing 53 includes a pair of spaced side walls 54 and 55 (FIG. 7), a back inclined plate 56 and a forward inclined plate 57. The apparatus 51 further includes a connector supply station, designated generally by the numeral 58, an escapement station, designated generally by the numeral 59 and a connector transfer station, designated generally by the numeral 61. Also included in the apparatus 51 is an assembly and securing station, designated generally by the numeral 62. The assembly and securing station is enclosed by a pair of spaced control enclosures 63 and 64 and a front enclosure 66.

Connector Supply

As illustrated in FIGS. 3 and 4, a cardboard box, designated generally by the numeral 67, is formed with two side walls 68 and 69, two end walls 71 and 72 and a bottom 73. The side walls 68 and 69 are of double thickness which is formed by folding integrally-formed single-thickness sections along the top edge of the box 67. The formation of the double-thickness side walls 68 and 69 results in the formation of end slots 74 and 76, respectively, as viewed in FIG. 4. As further illustrated in FIG. 4, the end wall 72 is formed with two side flaps 77 and 78 which fit into the slots 74 and 76, respectively, when the box 67 is assembled.

In preparation for use of the apparatus 51, four layers of the connectors 31 are placed in the box 67. Each layer of the connectors 31 includes four rows of twelve connectors in each row. The twelve connectors 31 of each row are arranged in intimate side-by-side engagement and the longitudinal axis of each connector is in parallel with the longitudinal axis of the box 67. All of the connectors 31 are arranged in the box 67 with the two rows of terminals 33 extending upwardly from within the box. A thin layer of cardboard 80 (FIGS. 2 and 4) is placed between each layer of the connectors 31.

Typically, the connectors 31 are packaged within the box 67, as described, at the manufacturing location and a cover (not shown) is secured to the box to retain the connectors in the box during shipping.

As illustrated in FIG. 3, a box support, designated generally by the numeral 79, includes two spaced side walls 81 and 82 and a bottom 83. The upper ends of the side walls 81 and 82 are formed with flared sections 84 and 86, respectively, and handle grips 87 and 88, respectively. A pair of handles 89 and 91 (FIGS. 6 and 7) are attached to the underside of the box support 79. The handle grips 87 and 88 and the handles 89 and 91 permit manual transporting of the box support 79.

The box support 79 further includes a pair of spaced parallel bars 92 and 93 which are attached to the underside thereof. The bars 92 and 93 extend in cantilever from one side of the box support 79 and in cantilever on the other side thereof. A pair of spaced opposed tracks 94 and 96 are formed in adjacent ends of the side walls 81 and 82, respectively.

As illustrated further in FIG. 3, the box 67 containing a supply of the connectors 31 is placed in the box support 79 so that the end wall 72 of the box is adjacent to the tracks 94 and 96 of the box support. Referring to FIG. 4, the end wall 72 of the box 67 is moved outwardly in the direction of arrow 97. After the flaps 77 and 78 have been completely removed from the slots 74 and 76, respectively, the flaps are folded in the direction of the arrows 98 and 99, respectively, and into engagement with the adjacent surface of the end wall 72. Referring to FIG. 5, a rubber band 101 is placed around the end wall 72 and the folded flaps 77 and 78 to retain together the wall and the flaps. The banded assembly of the end wall 72 and the flaps 77 and 78 then assume the downward position as illustrated whereby the adjacent ends of the layers of the connectors 31 are exposed. An end cover 102, formed with a pair of spaced tabs 103 and 104, is inserted into the tracks 94 and 96. The tabs 103 and 104 engage the upper ends of the tracks 94 and 96 to facilitate location of the end cover 102 and adjacent to the previously exposed ends of the layers of the connectors 31.

The assembled box 67 and box support 79 are now ready to be assembled with the apparatus 51 (FIG. 2) at the connector supply station 58.

Connector Supply Station 58

Figure 7:
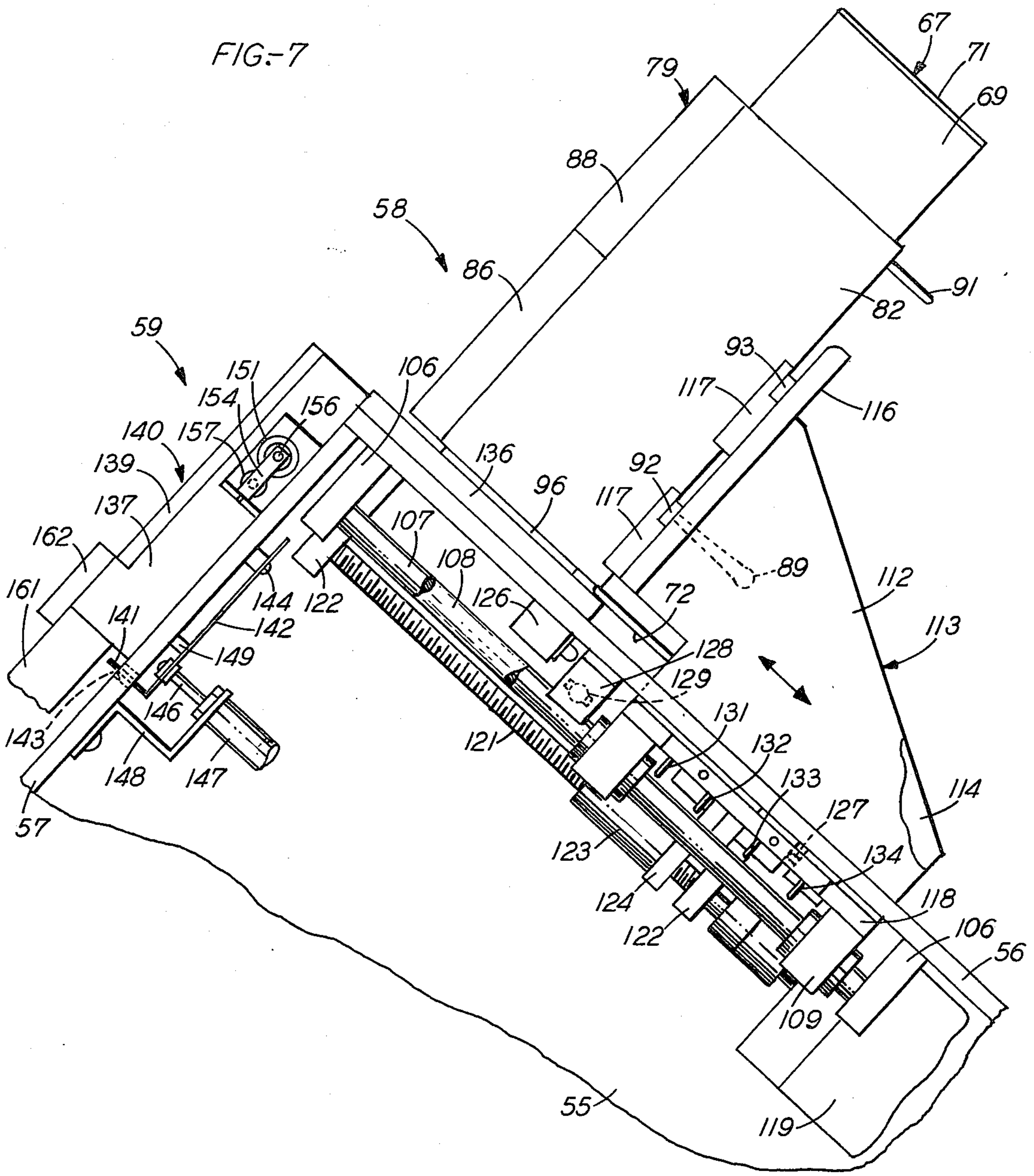
FIG. 7 is a partial side view with parts broken away showing a box elevator of the apparatus of FIG. 2 and controlling mechanism therefor.

As illustrated in FIG. 7, the connector supply station 58 is supported on the back inclined plate 56 of the apparatus housing 53. Two pairs of rod supports 106 (only one pair shown) are located at the supply station 58 and are secured to the inside face of the plate 56 and support two spaced parallel guide rods 107 and 108 therebetween. A first pair of bearings 109 and 111 are mounted spatially on the rod 107 and are connected to an elevator support plate 112 of an elevator, designated generally by the numeral 113, which is angled downwardly toward the plate 56. The elevator 113 also includes another elevator support plate 114 which is spaced from and parallel to the support plate 112. The support plate 114 is attached to a second pair of bearings (not shown) which move over the guide rod 108.

A first support bar 116 is mounted on the upper edge of the support plate 112 and a second support bar (not shown) is mounted on the upper edge of the support plate 114. For discussion purposes, the second support bar will also be referred to by the numeral 116. A first pair of cleats 117 are mounted on the upper surface of the support bar 116 with openings thereof facing away from the plate 56. A second pair of cleats (not shown) are mounted on the upper surface of the support bar of the support plate 114 in an identical fashion. For discussion purposes, the cleats of the second pair will also be referred to by the numeral 117. The second pair of cleats are aligned with the first pair of cleats 117 and also have openings which face away from the housing plate 56. As shown in FIG. 7, the elevator 113 is angled downwardly toward the plate 56.

An elevator slide plate 118 is located inside of the housing plate 56 and is attached to the elevator support plates 112 and 114 for movement therewith. A reversible motor 119 is mounted internally of the housing 53 adjacent to the plate 56 and drives a screw shaft 121 which is mounted for rotation within and between a pair of spaced supports 122. The spaced supports 122 are fixedly attached to the inside of the plate 56. A screw-shaft follower 123 is mounted for movement on the screw shaft 121 as the screw shaft is rotated by the motor 119. An "L" shaped bracket 124 is secured at one portion thereof to the screw-shaft follower 123 and the slide plate 118 at another portion thereof. Thus, upon operation of the motor 119, the screw shaft 121 rotates to move the screw-shaft follower 123, the slide plate 118, the support plates 112 and 114 and the support bar 116 thereby providing movement for the elevator 113. As the elevator 113 is moved, the first pair of bearings 109 and 111 slide over the rod 107 and the second pair of bearings (not shown) slide over the rod 108 to thereby provide guiding support for the elevator.

An upper limit switch 126 and a lower limit switch 127 are secured to spaced portions of the inner surface of the plate 56. The switches 126 and 127 are aligned to be actuated by structural portions of the elevator 113 and thereby establish upper and lower travel limits for the elevator. An index control switch 128 is also mounted to the inner surface of the plate 56 and is provided with a roller actuator 129. The roller actuator 129 is positioned to be periodically engaged by one of four dowel pins 131, 132, 133 and 134 which are mounted on the slide plate 118 and thereby movable with the elevator 113. Operation of the switch 128, by virtue of the pins 131, 132, 133 and 134 engaging the roller actuator 129, facilitates indexing control of the elevator 113.

The box 67 is assembled with the box support 79 to form an assembly, designated generally by the numeral 135, as illustrated in FIG. 5. In the procedure of placing the assembly 135 of the box 67 and the box support 79 on the elevator 113, the assembly is raised to position the cantilever ends of the bar 93 on the rear curved portion of the support bars 116. The assembly 135 is generally in a horizontal position at this time and is thereafter pivoted about the rear curved portion of the support bars 116 until the cantilever ends of the bar 92 engages each of the support bars at a point between the cleats 117. The assembly 135 has now assumed the angular position of the support bars 116. When released, the assembly 135 then slides, by gravity, toward the housing plate 56 until the cantilever ends of the bars 92 and 93 have moved into, and are firmly seated in, the openings of the cleats 117 as illustrated in FIGS. 2, 6 and 7.

The end cover 102 is now positioned adjacent to a face plate 136 (FIG. 7) which is secured to an outer portion of the plate 56. As noted above, the box 67 is now angled downwardly in a direction parallel with the plane of the support bars 116 whereby the connectors 31 within the box tend to move, by gravity, toward the end cover 102. Thereafter, a top cover (not shown) is placed over the upper layer of connectors 31 within the box 67 and the end cover 102 is withdrawn as illustrated in FIG. 6. The top cover, which can be removed after the end cover 102 has been withdrawn, prevents the upper layer of connectors 31 from being accidentally disturbed when the end cover is being withdrawn. After the end cover 102 has been withdrawn, the forwardmost connectors 31 in each layer of connectors move slightly toward and into engagement with the face plate 136.

The connector supply station 58 is now ready to begin the supply of connectors 31 when other conditions within the apparatus 51 have been satisfied.

Escapement Station 59

Referring again to FIG. 2, the escapement station 59 is located on the upper end portion of the forward inclined plate 57 and includes a pair of spaced, parallel side walls 137 and 138 extending between a floor formed by the portion of the forward inclined plate between the two side walls. The space between the side walls 137 and 138 is sufficient to permit a row of twelve connectors 31 to pass therebetween in the same side-by-side arrangement of the rows of connectors in the box 67. A plastic cover 139 is positioned over the space between and is secured to the side walls 137 and 138 to define an escapement enclosure, designated generally by the numeral 140. The cover 139 prevents the connectors 31 from moving upwardly and out of the escapement enclosure 140 as the connectors are moved therethrough.

A first row of the connectors 31 will slide through an entry end of the escapement enclosure 140, a trailing station in a rear section of the escapement enclosure, move into a leading station in a forward section of the enclosure and engage an upturned end 141 of a spring steel escapement member 142 which passes through a slot 143 formed in the plate 57. The escapement member 142 is attached for pivoting movement at one end 144 thereof to the underside of the plate 57. An intermediate portion of the escapement member 142 is positioned to be engaged by a piston rod 146 of an air cylinder 147 secured to the underside of the plate 57 by a bracket 148. A limit stop 149 is secured to the underside of the plate 57 and limits the upward travel of the escapement member 142 and, consequently, the positioning of the upturned end 141 into the path of the rows of connectors 31.

After the first row of connectors 31 has moved into the leading station of the escapement enclosure 140 to engage the upturned end 141 of the escapement member 142, a second row of the connectors moves into the trailing station of the escapement enclosure. An air cylinder 151, mounted on the plate 57 adjacent to the side wall 137, has a forward piston rod 152 (FIG. 2) extending therefrom which is movable into an opening in the side wall 137 is alignment with the trailing station. As the piston rod 152 passes through the opening in the side wall 137, the rod engages the adjacent connector 31 in the second row of connectors in the escapement enclosure 140 and presses the entire row toward the side wall 138. This action prevents the second row of connectors 31 and any subsequent rows from moving further through the escapement enclosure 140.

Thereafter the upturned end 141 of the escapement member 142 is retracted to permit the first row of connectors 31 to move downwardly over the forward inclined plate 57 and out of the leading station of the escapement enclosure 140 and through an exit end thereof. During this period, the air cylinder 151 and piston rod 152 prevents the second row of connectors 31 from moving forward in the escapement enclosure 140. After the first row of connectors 31 has passed over the retracted upturned end 141 of the escapement member 142, the air cylinder 147 is controlled to return the upturned end of the escapement member into the path of the next row of connectors.

The air cylinder 151 is then controlled to withdraw the piston rod 152 and thereby release the second row of connectors 31. Upon release, the second row of connectors 31 then slides down the forward inclined plate 57 within the escapement enclosure 140 until the connectors reach the upturned end 141 of the escapement member 142. A third row of connectors 31 then moves into the trailing station within the escapement enclosure 140 previously occupied by the second row of connectors.

A switch actuator bar 154 is attached to a rear piston rod 156 of the air cylinder 151 and is positioned in the path of a pneumatic valve actuator 157. If there is no row of connectors 31 in alignment with the piston rod 152, which is representative of a depleted supply of connectors, the rods 152 and 156 are permitted to travel to a position whereby the actuator 157 is depressed to signal the depleted supply condition. Also, if less than a full row of connectors 31 moves into the trailing station of the escapement enclosure 140 due to missing or jammed connectors, the actuator 157 will be depressed to initiate indication of the faulty condition.

Connector Transfer Station 61

The connector transfer station 61, as illustrated in FIG. 2, is located on a middle-to-lower portion of the forward inclined plate 57. A pair of spaced, parallel overhead supports 158 and 159 are mounted on and extend from side to side of the forward inclined plate 57. The supports 158 and 159 provide suspending overhead support for a plurality of flat guide tracks 161.

As illustrated in FIGS. 2 and 7, entry ends of the tracks 161 are located over the upturned end 141 of the escapement member 142 and extend into the exit end of the escapement enclosure 140 where they are secured to an overhead support 162. As noted hereinbefore, each of the connectors 31 passes from the box 67 (FIG. 2) and into the escapement enclosure 140 with the two, parallel rows of terminals 33 (FIG. 1) extending upwardly. As the first row of connectors 31 enters the leading station of the escapement enclosure 140, the forward terminals 33 of each row of terminals of each connector will locate adjacent to one side of the entry end of an associated one of the tracks 161. At the same time, the forward terminals 33 of the other row of terminals of each connector 31 will locate on the opposite side of the entry end of the associated one of the tracks 161. In this manner, each connector 31 of the first row of connectors now straddles the underside of an associated one of the tracks 161.

As illustrated in FIG. 2, the entry ends of the tracks 161 are aligned with the compacted arrangement of the rows of connectors 31 as they pass through the escapement enclosure 140. Each of the tracks 161 is contoured beyond the entry end to arrange the tracks in a diverging array so that they are spaced apart as illustrated at the exit ends thereof.

Figure 8:
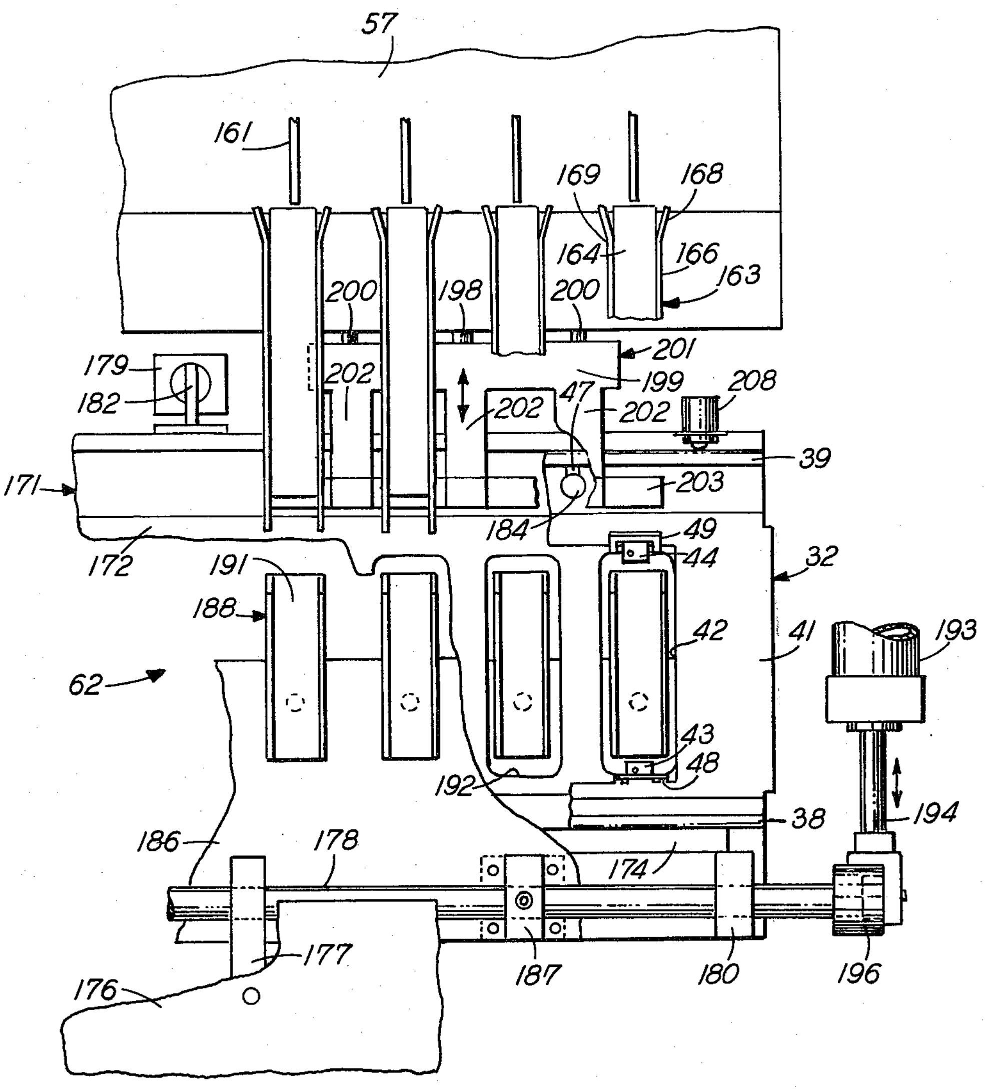
FIG. 8 is a partial plan view with parts broken away showing an assembly facility of the apparatus of FIG. 2 for supporting and positioning a back plate during assembly of connectors therewith in accordance with certain principles of the invention.

Referring to FIGS. 2 and 8, a plurality of connector guides, designated generally by the numeral 163, are secured to and extend in cantilever from the lower end of the forward inclined plate 57. Each of the connector guides 163 is centrally located in alignment with the exit end of an associated one of the tracks 161. As illustrated in FIG. 8, each of the connector guides 163 is formed in a channel-like configuration having a base 164 and two spaced side walls 166 and 167. The entry end of the side walls 166 and 167 of each of the guides 163 is formed with flared sections 168 and 169, respectively. The side walls 166 and 167 are spaced apart sufficiently to permit one of the connectors 31 to pass longitudinally therethrough. Also, the flared sections 168 and 169 facilitate guiding entry of the connectors 31 into the guides 163.

Assembly and Securing Station 62

Figure 9:
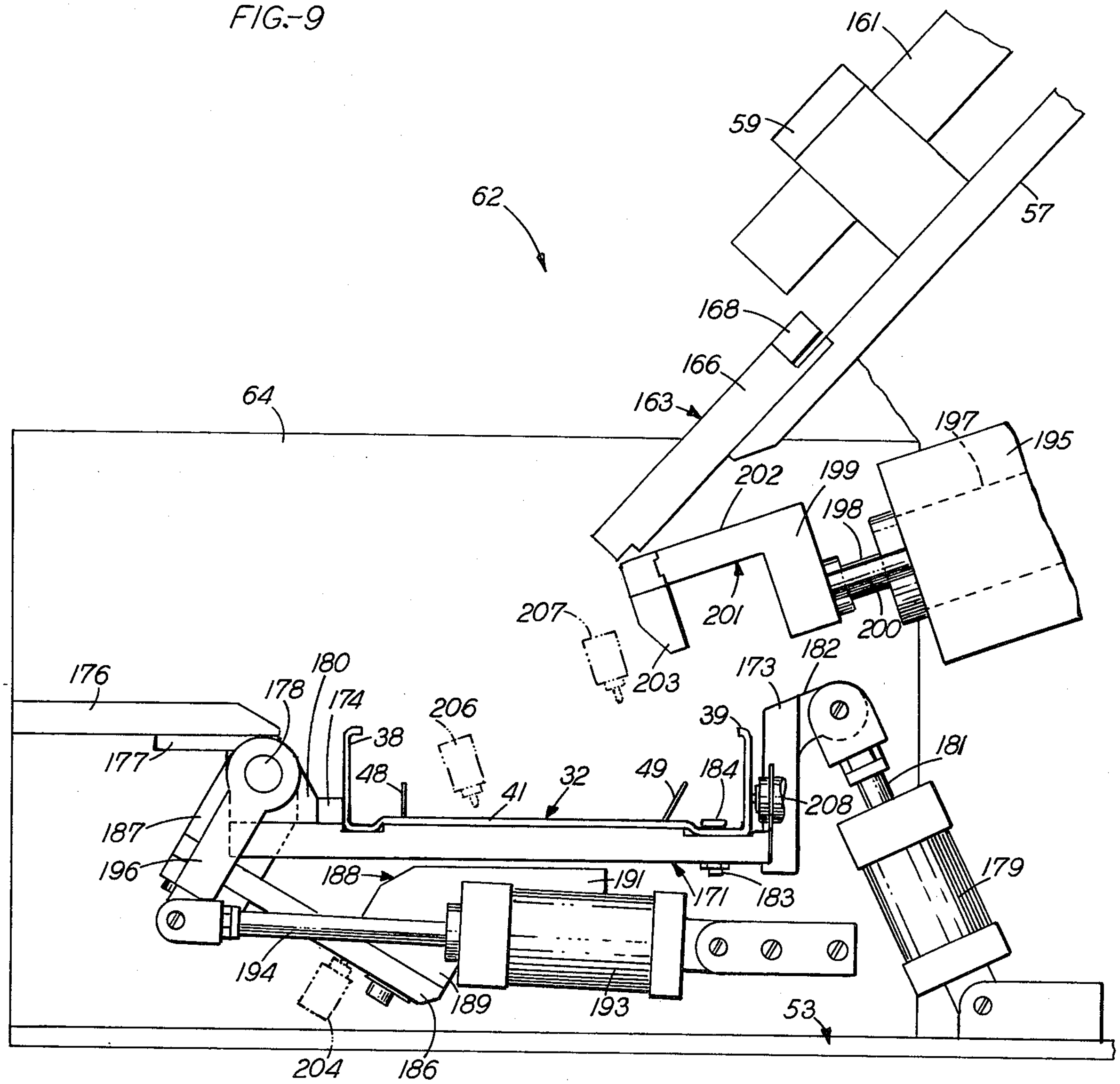
FIGS. 9 through 13 are side views of the assembly facility of FIG. 8 showing various positions of component parts of the facility during assembly of the connectors with the back plate.

Referring to FIGS. 8 and 9, a back-plate support table, designated generally by the numeral 171, is located at the assembly and securing station 62. The table 171 provides a supporting nest for the back plate 32 during the period when the connectors 31 are assembled and secured with the back plate. The table 171 is formed with a bed 172 for receiving the back plate 32. The table 171 further includes a back wall 173, which provides a back stop for the side section 39 of the back plate 32, and a bar 174 which provides a forward stop for the side section 38.

A shelf 176 is located within the assembly and securing station 62 and is secured to the enclosures 63, 64 and 66. A plurality of shaft supports 177 (one shown) are secured to the underside of the shelf 176 and provide free rotational support for a shaft 178 relative thereto.

The shaft 178 has portions thereof mounted within bearings 180 (one shown) which are secured to spaced portions of the support table 171 and which are mounted for free rotation relative to the shaft. This arrangement permits the table 171 to be supported on the shaft 178 and to be moved in pivotal fashion freely about and independently of the shaft.

Figure 10:
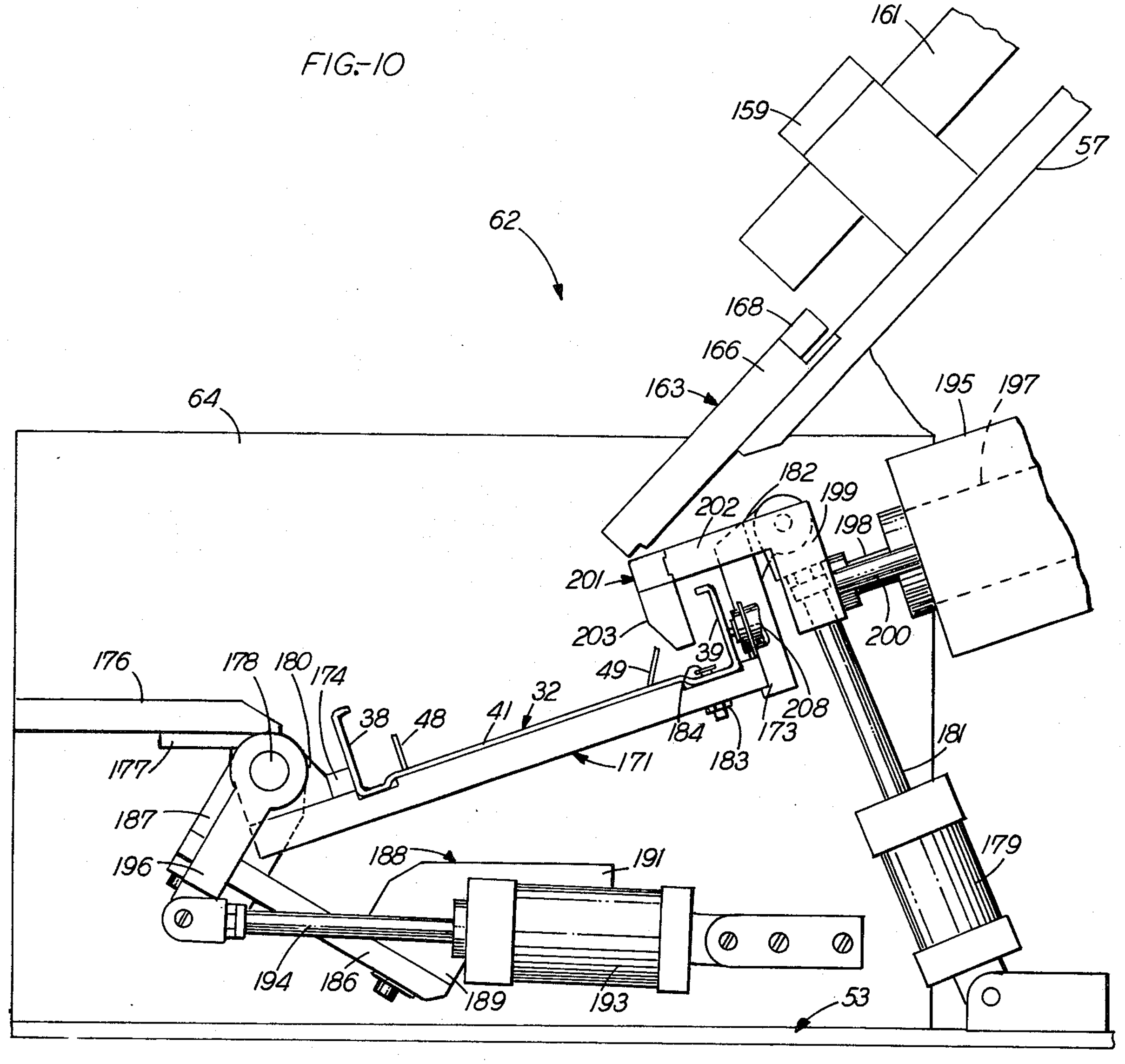

As more clearly illustrated in FIG. 9, an air cylinder 179 is secured at one end to the housing 53 for pivotal movement relative thereto. A piston rod 181 extends from the opposite end of the air cylinder 179 and is attached to a bracket 182 which is formed on the back wall 173 of the table 171. When the air cylinder 179 is operated, the piston rod 181 moves upwardly thereby pivoting the table 171 about the axis of the shaft 178 to a position as illustrated in FIG. 10.

A bolt 183 is fastened to the table 171 adjacent to the back wall 173 and is formed with a raised head 184 which extends above the bed 172 of the table. When the back plate 32 is assembled with the table 171, the side section 39 is inserted angularly downwardly so that the opening 46 (FIG. 1) fits over the head 184 of the bolt 183. The side section 38 of the back plate 32 is then moved downwardly toward the bar 174 of the table 171 as the back plate is moved rearwardly toward the back wall 173 of the table. As the back plate 32 is moved rearwardly, the head 184 of the bolt 183 moves into the keyhole opening 47 (FIG. 1) formed in the back plate to limit further rearward movement of the back plate. The use of the openings 46 and 47 of the back plate 32 with the head 184 of the bolt 183 provides facility for insuring accurate positioning and locating of the back plate on the table 171. Further, as the back plate 32 is moved rearwardly and located by the bolt 183 and keyhole opening 47, the side section 38 is properly located adjacent to the bar 174 to provide a forward stop for the back plate. The back plate 32 is thereby firmly nested in the table 171 in preparation for reception of the connectors 31.

Referring again to FIGS. 8 and 9, a connector-receiver support plate 186 is secured to a plurality of shaft couplers 187 (one shown) along one edge thereof. Each of the couplers 187 is keyed to the shaft 178 for rotation therewith. A plurality of connector receivers, designated generally by the numeral 188, are mounted on the support plate 186 in parallel, spaced relation as illustrated in FIG. 8. As viewed in FIG. 9, each of the receivers 188 is formed with a base 189 which extends perpendicularly from the support plate 186. Each of the receivers 188 further includes a channel-like nest 191 which is integrally formed with the base 189 and which extends angularly therefrom. The nests 191 of the plurality of receivers 188 are each aligned with an associated one of a corresponding plurality of openings 192 formed in the back-plate support table 171 (FIG. 8) which are, in turn, aligned with one of the three openings 42 formed in the web 41 of the back plate 32.

Figure 11:
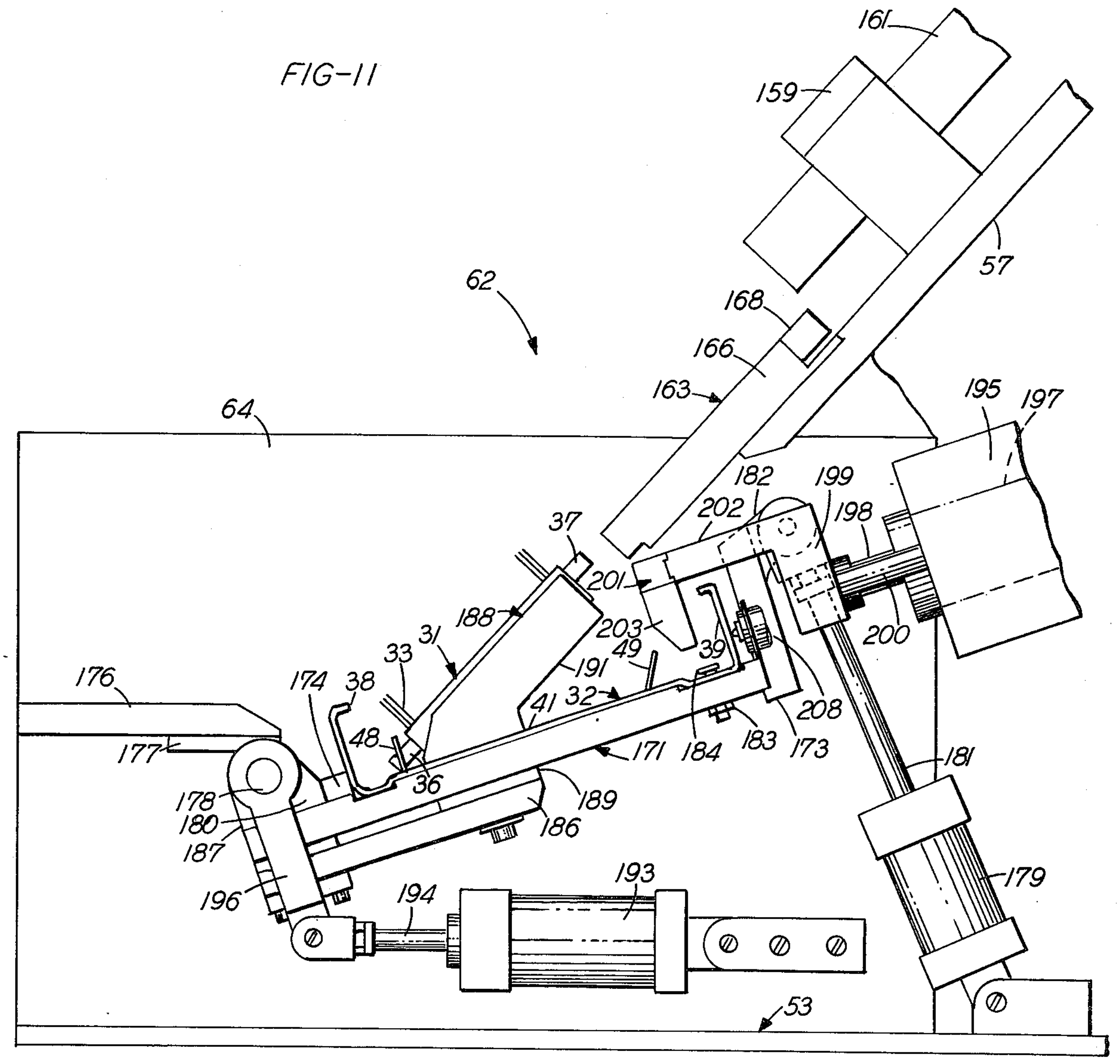

Referring further to FIG. 9, an air cylinder 193 is attached at one end to the housing 53 for pivotal movement relative thereto. A piston rod 194 extends from the other end of the air cylinder 193 and is attached for pivotal movement to a crank arm 196 which is keyed to the shaft 178. When the air cylinder 193 is operated, as illustrated in FIG. 11, the piston rod 194 is withdrawn to move the crank arm 196 and thereby rotate the shaft 178. Since the receiver support plate 186 is attached to the shaft 178 through the coupler 187, the plate will move when the shaft is rotated. Movement of the plate 186 results in movement of the receivers 188 to the position illustrated in FIG. 11 whereby each of the receiver nests 191 is aligned with an associated one of the connector guides 163.

As illustrated in FIG. 9, an air cylinder 197 is mounted in a support block 195 and is provided with a piston rod 200. The support block 195 also supports a pair of guide rods 198 (FIGS. 8 and 9) for sliding movement relative thereto. The guide rods 198, which are mounted on opposite sides of the air cylinder 197 within the support block 195, and the piston rod 200 are attached to a cross arm 199 of a pusher member, designated generally by the numeral 201. Three parallel spaced legs 202 of the pusher member 201 extend from the cross arm 199 and provide support for a pusher bar 203. The pusher bar 203 extends in spaced parallel relation to the edge of the adjacent opening 42 of the back plate 32 as illustrated in FIG. 8. Two other air cylinders identical to the air cylinder 197 support pusher bars identical to the pusher bar 203 in the same arrangement adjacent to the other two openings 42 (not shown) in the back plate 32 and operate simultaneously therewith. The pusher bar 203 is positioned to ultimately engage and bend the clasps 49 in the securing of the connectors 31 with the back plate 32.

As illustrated in phantom in FIG. 9, a pair of pneumatic valve actuators 204 and 206 are positioned to be engaged by the support plate 186 at lower and upper limits of travel, respectively, thereof. Another pneumatic valve actuator 207, also shown in phantom, is positioned to engage the back-plate support table 171 at its upper limit of travel. Still another pneumatic valve actuator 208 is secured to the back wall 173 of the back-plate support table 171 and is actuated by the locating of the back plate 32 within the table. The actuators 204, 206, 207 and 208 assist in and facilitate operational control of the apparatus 51.

After the back plate 32 has been located in the table 171 as illustrated in FIG. 9, the air cylinder 179 is operated to raise the table and the back plate to the position illustrated in FIG. 10. It is noted that the normal position of the pusher bar 203 is illustrated in FIG. 10. This positioning permits the pusher bar 203 to be located between the side section 39 of the back plate 32 and the clasps 49 which are to be ultimately bent by the pusher bar. Thereafter, the air cylinder 193 is operated to move the receivers 188 to the position illustrated in FIG. 11 whereby the nests 191 are aligned with respective ones of the guides 163.

Due to the angular arrangement between the base 189 and the nest 191 of each of the receivers 188, the nest is moved through and located on the other side of the aligned table opening 192 and the back plate opening 42. In this position, the base 189 and the receiver support plate 186 remain adjacent to the underside of the back-plate table 171. This permits the clasps 48 of the back plate 32 to be exposed on the upper side of the table 171 and in alignment with the lower end of the associated raised nest 191.

As described hereinbefore, the first row of connectors 31 then advances through the connector transfer station 61 (FIG. 2) and exits from the guides 163. The connectors 31 are moved from the guides 163 and enter the aligned nests 191 of the receivers 188 as illustrated in FIG. 11. As each of the connectors 31 slides into the lower end of the associated nest 191, the flange end 36 of the connector moves into the respective clasp 48 as illustrated in FIG. 11. In addition, the flange end 37 of each connector 31 extends beyond the upper raised end of the respective receiver 188 as viewed in FIG. 11.

Figure 12:
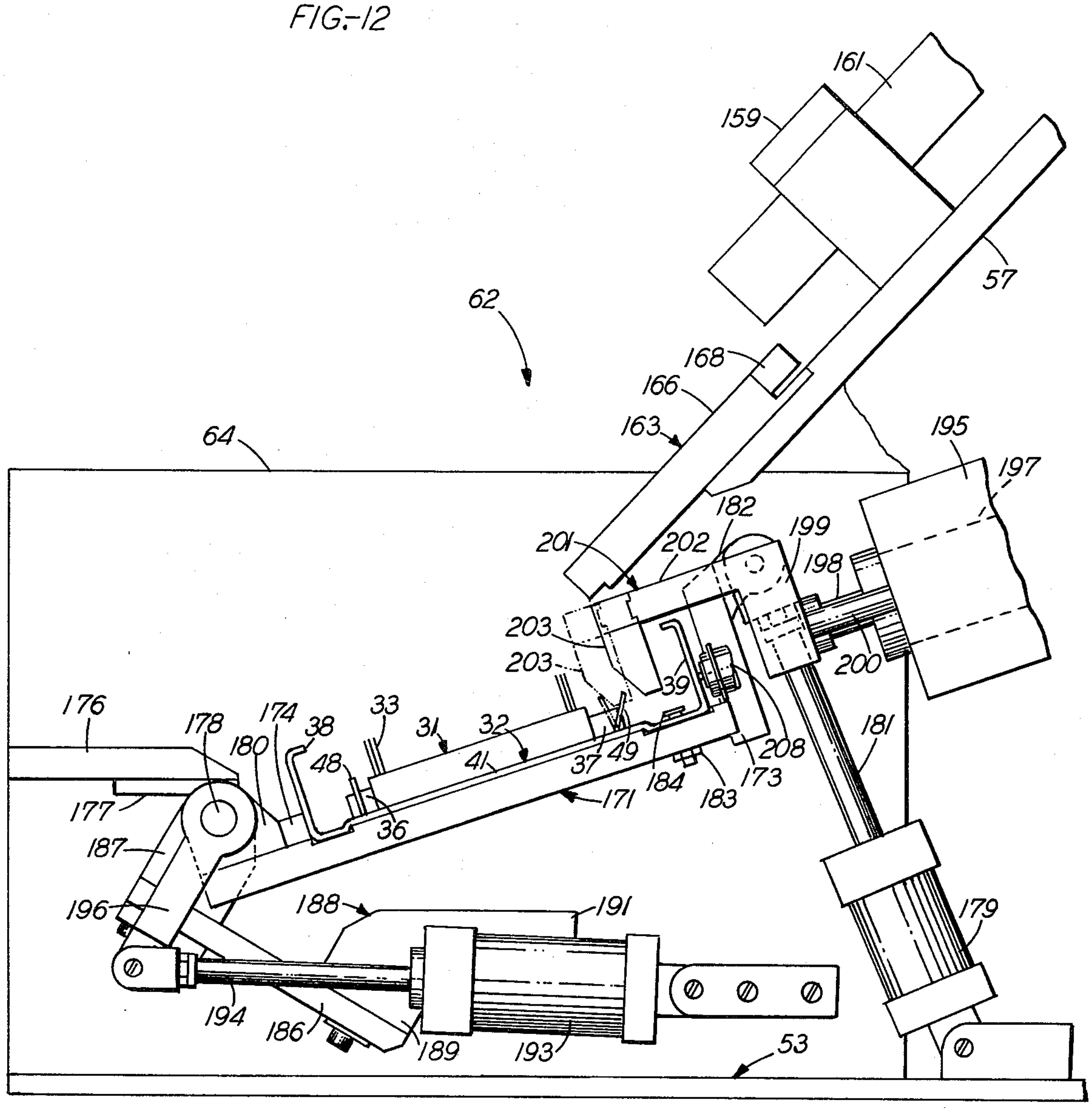

Thereafter the air cylinder 193 is controlled to extend the piston rod 194 therefrom resulting in movement of the receivers 188 to the position illustrated in FIG. 12. As the nests 191 pass through the openings 42 in the back plate 32, the flange end 37 of each connector 31 engages the respective stop tab 44. This prevents continued downward movement of the connector 31 as the receiver 188 continues to be moved downwardly to the normal rest position illustrated in FIG. 12.

At this time, the flange end 36 of each connector 31 is enclosed within the associated clasp 48 and the flange end 37 is resting on the associated stop tab 44 adjacent to the associated bendable clasp 49. As viewed in FIG. 12, the air cylinder 197 is controlled to move the pusher bar 203, as illustrated in phantom, into engagement with the adjacent bendable clasps 49 and bend the clasps over the flange ends 37 of the connectors 31 to secure the connectors with the back plate 32. Thereafter the air cylinder 197 is controlled to retract the pusher bar 203 and the air cylinder 179 is controlled to lower the table 171 to the position illustrated in FIG. 13. The back plate 32 with the plurality of connectors 31 assembled and secured therewith can now be removed from the assembly and securing station 62.

Electrical and Pneumatic Operation

Figure 14:
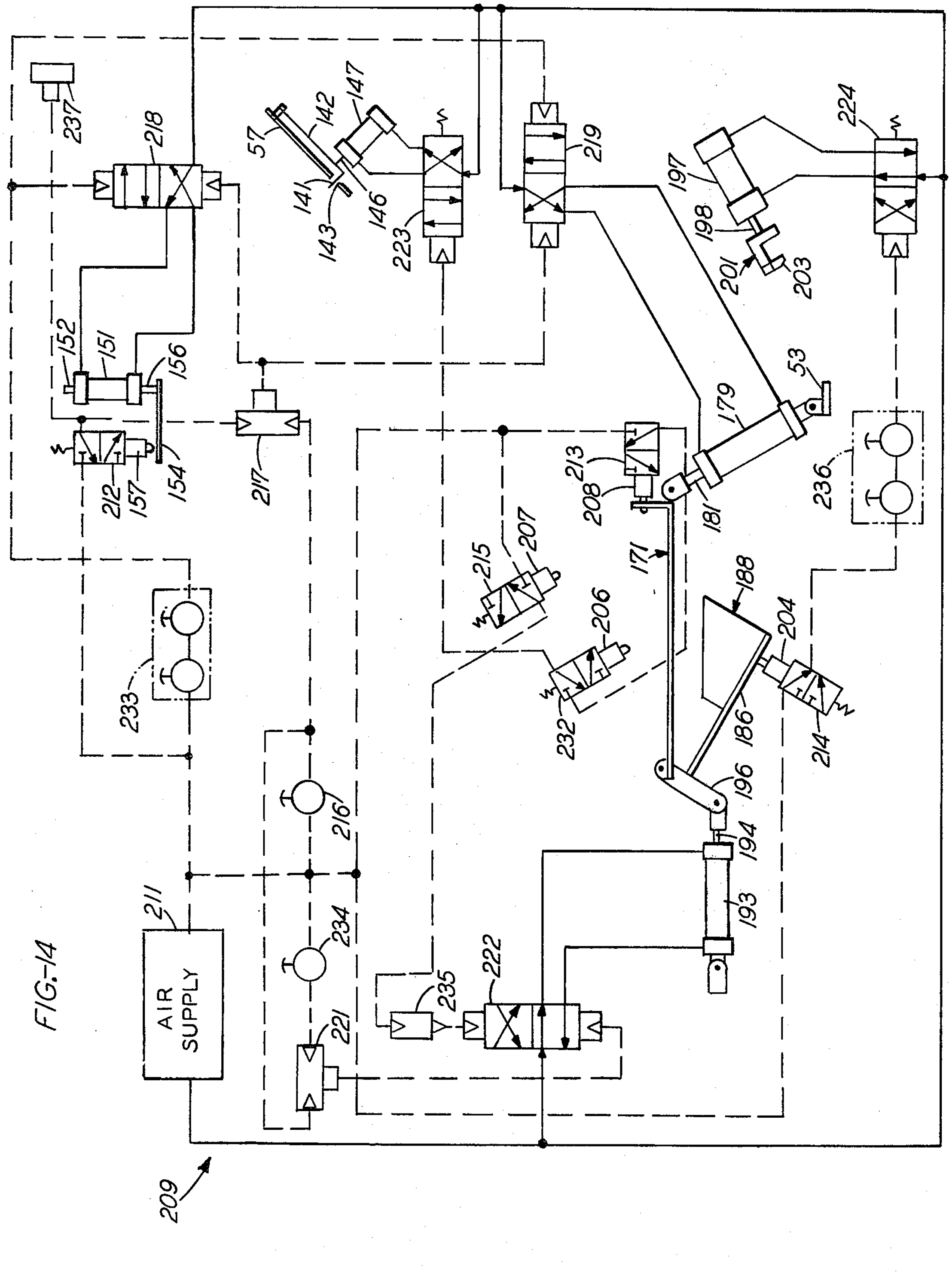
FIG. 14 is a diagram of a pneumatic system for assisting in the control of operation of the apparatus of FIG. 2

Referring to FIG. 14, a pneumatic system, designated generally by the numeral 209, of the apparatus 51 includes an air supply 211. The air supply 211 provides a high pressure supply of air through conduits, indicated in solid lines, to operate and control the various air cylinders of the pneumatic system 209. A low pressure supply is provided from the air supply 211 through conduits, indicated in dotted lines, to position the various valves of the pneumatic system 209.

As illustrated, low pressure air is normally supplied directly to a missing-connector valve 212. However, the valve 212 is spring biased to a normal position to preclude the air from passing therethrough. A backplate sensing valve 213 is connected directly to the low pressure air but is spring biased to normally preclude the air from passing therethough. Low pressure air is also supplied to a receiver-down sensing valve 214. The valve 214 is spring biased to preclude passage of air therethrough in the spring-biased position. When the receivers 188 are in the down position as illustrated in FIG. 9, the valve actuator 204 (FIGS. 9 and 14) causes the valve 214 to shift and permit the low pressure air to pass therethrough to the low pressure conduit on the other side thereof. Low pressure air is also supplied to a table-up valve 215 which is spring biased to normally preclude passage of air therethrough.

Prior to use of the apparatus 51, the operator will insure that all pneumatically controlled components of the apparatus are in proper position for the feeding of connectors 31 thereto and the placing of the back plate 32 therein. This is accomplished by depressing a "TABLE DOWN" valve 216 (FIGS. 2 and 14) to couple low pressure air to a variety of components within the system 209.

Initially the air is coupled through a shuttle valve 217 to position a connector-clamp control valve 218 and a table control valve 219 as illustrated in FIG. 14. The control valve 218 facilitates the positioning of the air cylinder 151 in the retracted position whereby the piston rod 152 is withdrawn from the escapement enclosure 140 (FIG. 7). The table control valve 219 facilitates the positioning of the air cylinder 179 to locate the table 171 in the down or rest position as illustrated in FIG. 9. Low pressure air is also coupled through a shuttle valve 221 to position a receiver control valve 222. In this condition, the valve 222 facilitates the positioning of the receiver air cylinder 193 to locate the receivers 188 in the down position as illustrated in FIG. 9.

A spring biased valve 223 is normally positioned in the spring biased condition to control the escapement air cylinder 147. The air cylinder 147 positions the upturned end 141 of the escapement member 142 in the path of any connectors 31 subsequently fed into the escapement enclosure 140. Another spring biased valve 224 is normally positioned in the spring biased condition to control the clasp-bending air cylinder 197 whereby the pusher bar 203 is held in the retracted position. The two air cylinders (not shown) which perform functionally and identically to the air cylinder 197 are controlled in the same fashion.

As illustrated in FIG. 14, high pressure air is coupled through the valves 218, 219, 222, 223 and 224 to the air cylinders 151, 179, 193, 147 and 197, respectively, to provide operating pressure for the air cylinders.

Figure 15:
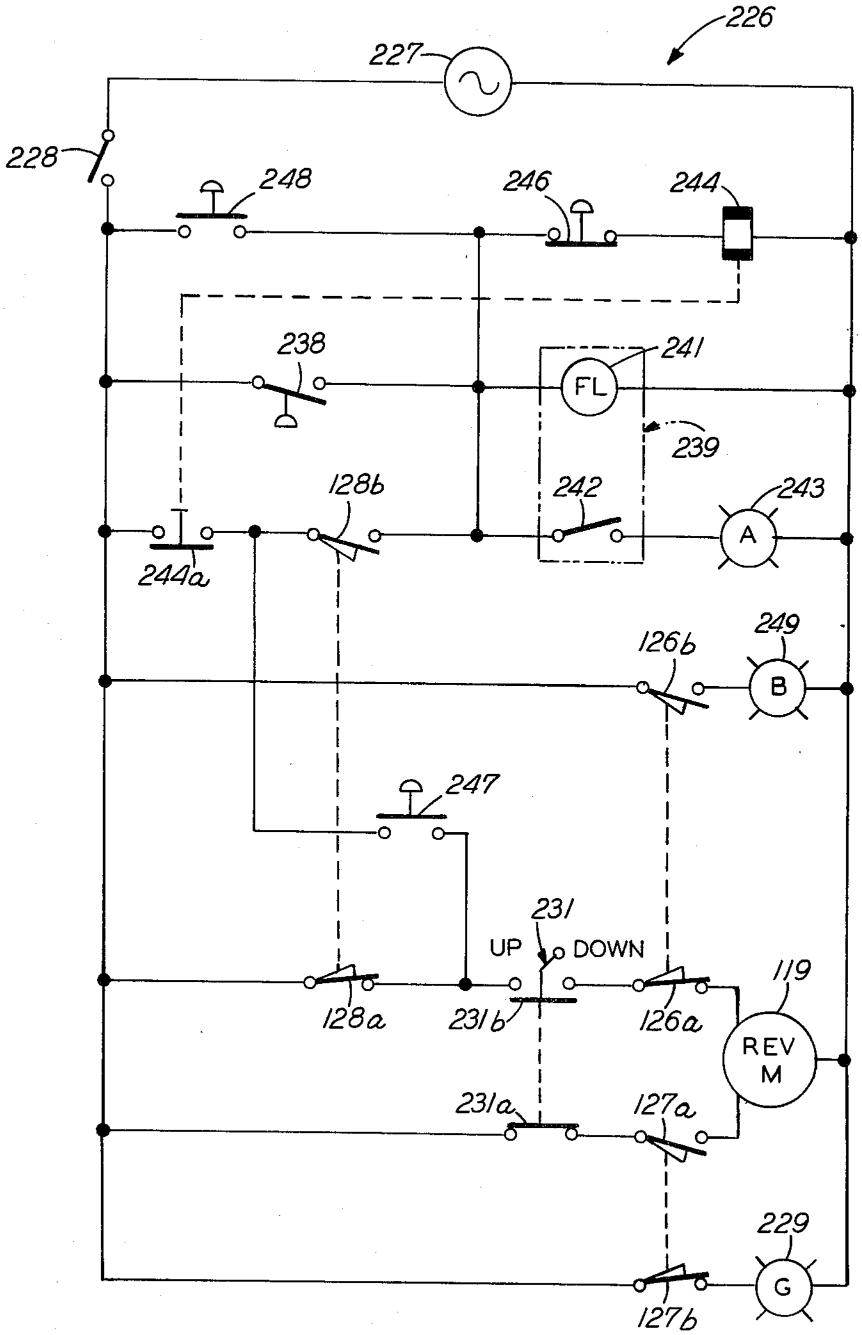
FIG. 15 is a schematic of an electrical system for assisting in the control of operation of the apparatus of FIG. 2.

Referring to FIG. 15, there is illustrated an electrical control system, designated generally by the numeral 226, for the apparatus 51. As illustrated, the electrical control system 226 includes an A.C. power source 227 which provides operating power for the various components of the system. An "ON-OFF" switch 228 (FIGS. 2 and 15) is connected in series with the power source 227 to facilitate control of the application of power from the source to the components of the system 226. The system 226 further includes the reversible motor 119 (FIG. 7) which is controlled to selectively raise or lower the elevator 113.

To insure that the elevator 113 is properly located in the bottom position for placing the assembly 135 of the box 67 and box support 79 on the elevator, the operator closes the switch 228 to apply operating power from the source 227 to the system 226. If the elevator 113 is in the bottom position, as illustrated in FIG. 7, the lower limit switch 127 is depressed by the elevator whereby one contact 127*a* (FIG. 15) is open to insure that the reversible motor 119 can not be operated to lower the elevator any further than illustrated in FIG. 7.

As further illustrated in FIG. 15, another contact 127*b* of the lower limit switch 127 is closed when the elevator 113 is in the bottom position and facilitates the application of power to a "GREEN" lamp 229 (FIGS. 2 and 15). Illumination of the "GREEN" lamp 229 indicates to the operator that the box and support assembly 135 (FIG. 5) can be placed on the elevator 113.

If the elevator 113 is above the bottom position, contact 127*a* is closed and contact 127*b* is open. In this condition, the "GREEN" lamp 229 is not illuminated which provides indication that the elevator 113 is somewhere above the bottom position. This indicates to the operator that the box and support assembly 135 are not to be placed on the elevator 113 at this time. The operator then moves an "UP-DOWN" switch, designated generally by the numeral 231 (FIGS. 2 and 15), to the "down" position whereby an associated contact 231*a* is closed. Since the contact 127*a* is closed, operating power is applied to the reversible motor 119 to lower the elevator 113 to the bottom position as illustrated in FIG. 7. As the elevator 113 reaches the bottom position, the lower limit switch 127 is depressed by the elevator, contact 127*a* is opened to stop the motor 119 and contact 127*b* is closed to illuminate the "GREEN" lamp 229. This provides indication to the operator that the assembly 135 of the box 67 and box support 79 can be placed on the elevator 113.

The pneumatic system 209 and the electrical control system 226 have now been conditioned and prepared for the feeding of connectors 31 into, and the placing of the back plate 32 within, the apparatus 51.

Referring to FIGS. 3, 4 and 5, the operator is now ready to place the assembly 135 of the cardboard box 67 and the box support 79 onto the elevator 113. The cardboard box 67 contains four layers of four rows each of the connectors 31 with twelve connectors in each row. After the box 67 has been placed on the support 79 and the end wall 72 and flaps 77 and 78 of the box have been positioned as illustrated in FIG. 5, the end cover 102 is placed in the tracks 94 and 96 to cover the open end of the box. The box support 79 is then positioned on the elevator 113 as viewed in FIGS. 6 and 7. The end cover 102 is then removed while the top cover (not shown) is held over the upper layer of connectors 31. Since the box 67 is angled downwardly toward the open end, the connectors 31 will be urged gravitationally toward the face plate 136 (FIG. 7).

Referring to FIG. 15, when the elevator 113 is in the bottom position, contact 128*a* of the index control switch 128 (FIG. 7) is closed and contact 126*a* of the upper limit switch 126 (FIG. 7) is also closed. After placing the box and support assembly 135 onto the elevator 113, the operator moves the "UP-DOWN" switch 231 (FIGS. 2 and 15) to the "up" position whereby contact 231*a* is opened and an associated contact 231*b* is closed. When contact 231*b* is closed, operating power is applied to the reversible motor 119 to raise the elevator 113. As the elevator 113 rises, indexing dowel pin 131 (FIG. 7) ultimately engages the roller actuator 129 and reverses the illustrated (FIG. 15) condition of contacts 128*a* and 128*b* of the index control switch 128 whereby contact 128*a* is opened to stop the motor 119. At the same time, contact 128*b* is closed.

When the motor 119 stops, the elevator 113 is in a first unload position whereby the top layer of connectors 31 slide downwardly toward the escapement enclosure 140 (FIG. 7). Thus the location of the indexing dowel pin 131 relative to the roller actuator 129 is directly related to the positioning of the elevator 113 for the feeding of the top layer of connectors 31 into the apparatus 51.

Ultimately, the first row of connectors 31 of the top layer slide into the escapement enclosure 140 and engages the upturned end of the escapement member 142 whereby the first row is located at the leading station of the enclosure. The second row of connectors 31 moves into the trailing station of the escapement enclosure 140 while the third and fourth rows move toward the enclosure but remain within the box 67.

Referring primarily to FIG. 14, the operator then places the back plate 32 into the table 171 whereby the valve actuator 208 (FIGS. 8 and 14) is depressed to shift the valve 213 to permit low pressure air to pass therethrough. Low pressure air then passes to a spring biased receiver-up valve 232. Since the receivers 188 are still in the down position, air is precluded from passing through the valve 232.

The operator then uses both hands, for safety purposes, to simultaneously depress a dual-valve single-pulse "TABLE-UP" control unit 233 (FIGS. 2 and 14) to permit a pulse of low pressure air, of one hundred milliseconds duration, to pass therethrough. The short pulse of low pressure air is then applied to move the valve 218 whereby high pressure air is applied to the air cylinder 151. The piston rod 152 is thereby moved into the escapement enclosure 140 to engage the adjacent connector 31 of the row of connectors in the trailing station of the escapement enclosure 140. Ultimately, the piston rod 152 presses and clamps the row of connectors 31 against the opposite side wall 138 (FIG. 2) to preclude the connectors at the trailing station from moving further through the escapement enclosure 140.

Also, upon depression of the control unit 233, low pressure air is applied to shift the valve 219. As the valve 219 is shifted, high pressure air is applied to the air cylinder 179 to raise the table 171, with the back plate 32, to the position illustrated in FIG. 10. When the table 171 reaches the upper position illustrated in FIG. 10, the actuator 207 is engaged to shift the spring biased valve 215 and permit the passage of air to a pulse valve 235. The pulse valve 235 provides a pulse of low pressure air of short duration to the receiver control valve 222 which causes the control valve to shift. The pulse valve 235 then precludes further passage of air therethrough. When the valve 222 is shifted, the air cylinder 193 is controlled to move the receivers 188 to the raised position as illustrated in FIG. 11. The receivers 188 are now in position to receive the connectors 31.

Use of the pulse valve 235 permits the valve 222 to be shifted as described but then removes continued application of air pressure in that direction so that the valve 222 can be readily shifted back at any time thereafter.

As the receivers 188 are moved from the down position, the valve 214 is shifted by spring biasing action to preclude passage of low pressure air therethrough. This insures that the pusher bar 203, which normally bends the clasps 49 (FIG. 1), will not be accidentally moved during the period when the receivers 188 are in the raised position.

The control unit 233 could be, for example, an anti-repeat, single-pulse unit identified as Model CSV-104, available from the Mead Fluid Dynamics Division of the Stanray Corporation of Chicago, Ill.

When the receivers 188 are moved into the raised position, the actuator 206 is engaged to shift the valve 232. Since the valve 213 has been previously shifted, low pressure air passes through the valves 213 and 232 to shift the valve 223. As the valve 223 is shifted, the air cylinder 147 is controlled to withdraw the escapement member 142 which permits the first row of connectors 31 to move out of the escapement enclosure 140 and into the diverging tracks 161 (FIG. 2) of the connector transfer station 61 (FIG. 2). Due to the clamping action of the piston rod 152 against the second row of connectors 31 located in the trailing station of the escapement enclosure 140, the second-row connectors are precluded from moving further within the enclosure.

The released connectors 31 of the first row move divergingly through the connector transfer station 61 and ultimately into the nests 191 of the raised receivers 188. As the connectors 31 move into the nests 191, the flange end 36 of each connector moves into the opening of the aligned clasp 48 of the back plate 32 as illustrated in FIG. 11.

After the operator observes that the connectors 31 have been deposited into the nests 191, the operator depresses a "RECEIVER DOWN" valve 234 whereby low pressure air is passed through the shuttle valve 221 to shift the valve 222. As the valve 222 is shifted, the air cylinder 193 is controlled to lower the receivers 188. As the receivers 188 are lowered, the connectors 31 supported in the nests 191 thereof are moved into the plane of the web 41 of the back plate 32. Ultimately, the flange end 37 of each connector 31 engages the associated stop tab 44 of the back plate 32 and comes to rest in the plane of the web 41 as illustrated in FIG. 12. The receivers 188 continue to move downwardly to the down position.

As the receivers 188 start to move downwardly from the raised position, the valve 232 is shifted under spring biasing action to preclude the passage of air therethrough. This results in removal of the application of air to shift the valve 223 whereby the valve shifts under spring biasing action. As the valve 223 shifts, the air cylinder 147 is controlled to move the upturned end 141 of the escapement member 142 into position to block the next row of connectors 31 which ultimately move into the leading station of the escapement enclosure 140.

When the receivers 188 reach the down position illustrated in FIG. 12, the actuator 204 is engaged to shift the valve 214 which permits the passage of air therethrough. The operator then uses both hands, for safety purposes, to simultaneously depress a dual valve unit 236 (FIGS. 2 and 14) which must be continuously depressed to permit air to pass therethrough. A valve unit of this type could, for example, be a Model CSV-101 available from the Mead Fluid Dynamics Division of the Stanray Corporation of Chicago, Ill.

When the dual valve unit 236 is depressed, air is applied to shift the valve 224 which remains shifted as long as the dual valve unit 236 is depressed. Upon the shifting of the valve 224, the air cylinder 197 is controlled to move the pusher bar 203 into engagement with the adjacent clasps 49 to bend the clasps as illustrated in phantom in FIG. 12.

After the operator has observed the completion of the clasp-bending operation, the dual valve unit 236 is released and the valve 224 shifts under spring biasing action. When the valve 224 shifts, the air cylinder 197 is controlled to withdraw the pusher bar 203.

Thereafter, the operator depresses the "TABLE DOWN" valve 216 whereby low pressure air is coupled through the shuttle valve 221 to the valve 222 to insure that the valve has been shifted to lower the receivers 188 prior to the lowering of the table 171.

Also, upon the depressing of the "TABLE DOWN" valve 216, low pressure air is coupled through the shuttle valve 217 to shift the valve 218. When the valve 218 is shifted, the air cylinder 151 is controlled to withdraw the piston rod 152 from the escapement enclosure 140. This results in the release of the second row of connectors 31 at the trailing station in the escapement enclosure 140 whereby the connectors move within the enclosure to the leading station thereof and engage the upturned end 141 of the escapement member 142.

Figure 13:
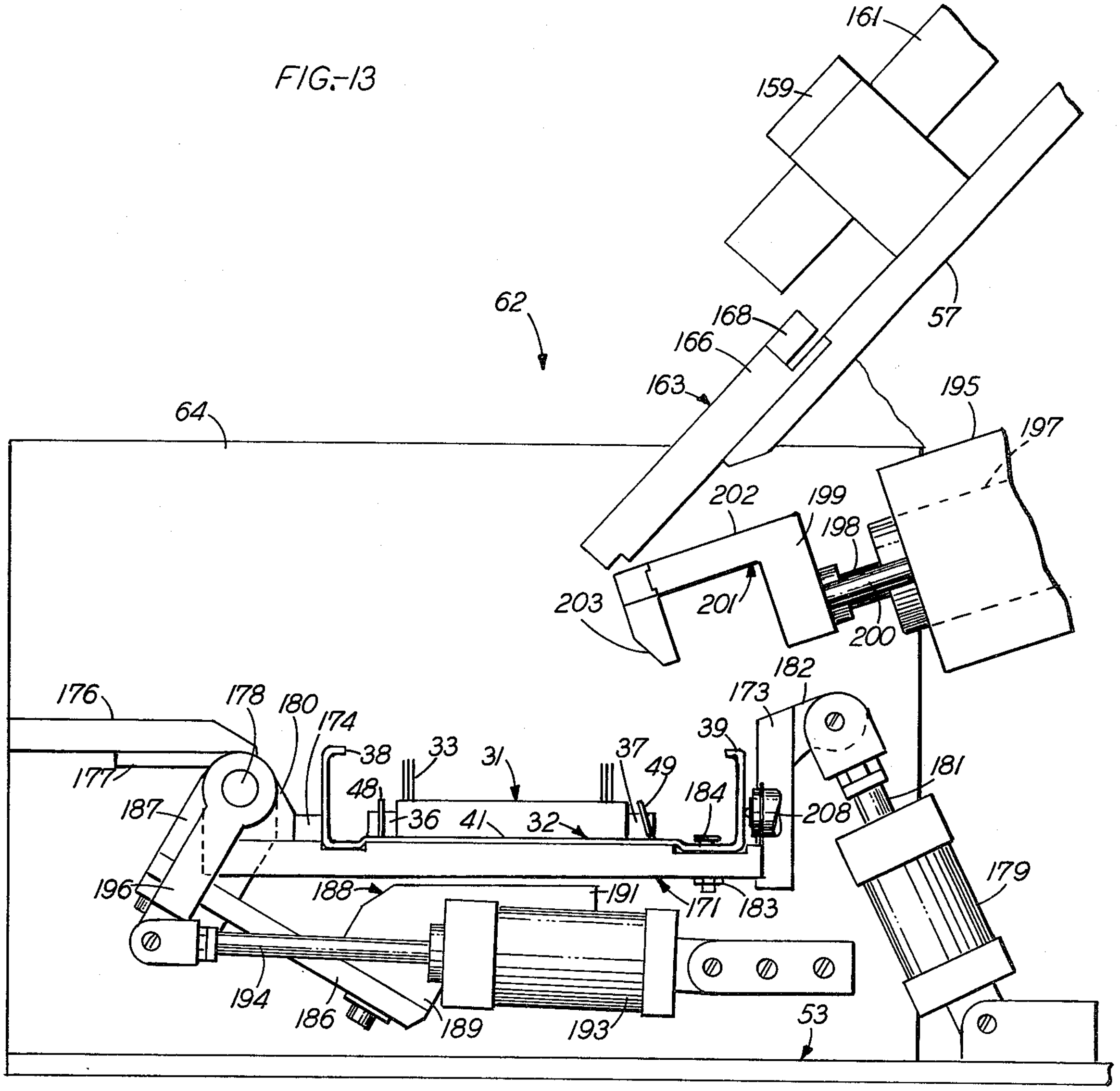

Low pressure air is also directed from the shuttle valve 217 to shift the valve 219 which controls the air cylinder 179 to lower the table 171 to the position illustrated in FIG. 13. Thereafter, the back plate 32 with the assembled and secured connectors 31 can be removed from the table 171 and another back plate positioned in the table for the next connector assembly and securing operation.

The apparatus 51 is now ready to proceed through a second cycle identical to the cycle described above. During the second cycle, the table 171 and receivers 188 are raised, the second row of connectors 31 is released from the escapement enclosure 140 and the connectors are ultimately assembled with and secured to the back plate 32. This pattern of identical cycles is repeated until the fourth, and last, row of connectors 31 of the top layer of connectors moves into the leading station of the escapement enclosure 140 and engages the escapement member 142. At this time, there are no connectors 31 in the trailing station of the escapement enclosure 140 adjacent to the pusher bar 158.

When the operator depresses the "TABLE UP" control unit 233 to initiate the feeding and assembly of the third row of connectors 31 with the back plate 32, the air cylinder 151 is controlled, as described before, to move the piston rod 152 into the trailing station of the escapement enclosure 140. However, as noted above, there are no connectors 31 in the trailing station of the escapement enclosure 140 whereby the piston rod 152 moves further into the enclosure. At this time, the switch actuator bar 154 engages the actuator 157 to shift the valve 212 and thereby permit the passage of low pressure air therethrough.

Low pressure air passing through the valve 212 is directed to a switch actuator 237 which functions to close, for a brief period, an electrical missing-connector switch 238 (FIG. 15) in the electrical control system 226. The switch 238 will remain closed only during the period when air is being applied to the actuator 237. Low pressure air is also coupled through the shuttle valve 217 to the valve 219 to insure that the table 171 has been moved to the down or rest position. Further, air is directed to the valve 218 to withdraw the piston rod 152 from within the escapement enclosure 140. This also results in movement of the bar 154 from engagement with the actuator 157 whereby the valve 212 shifts under spring biasing action. When the valve 212 shifts, air no longer passes to the actuator 237 and the switch 238 opens. Also, air is no longer coupled through the shuttle valve 217.

Referring to FIG. 15, during the period when the switch 238 is closed, a solid state recycle timer, designated generally by the numeral 239, is operated. The timer 239 is represented by a flicker (FL) control element 241 and a contact 241 and may be, for example, a Model CRB-48-70010 Solid State Recycle Timer available from the Potter and Brumfield Co. of Princeton, Ind. Operation of the flicker control element 241 results in intermittent operation of the contact 242 to cause flickering illumination of an "AMBER" lamp 243 (FIGS. 2 and 15). The flickering "AMBER" lamp 243 indicates to the operator that there are no connectors 31, or less than a full row of connectors, in the trailing station of the escapement enclosure 140.

As noted hereinbefore, if a jamming of connectors 31 occurs before the row of connectors moves into the escapement enclosure 140, the flickering "AMBER" lamp 243 could also indicate that less than a full row of connectors is in the trailing station. The operator would observe this after being signalled by the flickering "AMBER" lamp 243 and would then take corrective action.

When the switch 238 is closed for the brief period, a coil 244 of a relay is energized by the application of power through the switch 238 and a normally closed "RESET" switch 246 (FIGS. 2 and 15). Upon energization of the coil 244, an associated contact 244*a* is closed. Since the positioning of the indexing dowel pin 131 (FIG. 7) has facilitated the previous closing of contact 128*b* of the index control switch 128, the coil 244 is now locked in the energized state through contact 244*a*, contact 128*b* and switch 246. Thus when the missing-connector switch 238 opens after the brief period, the "AMBER" lamp 243 will continue to flicker.

If the operator observes that one or more connectors 31 are missing at the trailing station of the escapement enclosure 140 due to jamming or other reasons, the problem is corrected and the "RESET" switch 246 is opened to return the electrical control system 226 to the condition it was in prior to the closure of the missing-connector switch 238. The operator then proceeds with the assembly and securing procedure as described before.

However, if the operator observes that the flickering "AMBER" lamp 243 is signalling that all four rows of connectors 31 have passed through the trailing station of the escapement enclosure 140, the operator removes the thin layer of cardboard 80 from atop the second layer of connectors 31 and closes a "RAISE" switch 247 (FIGS. 2 and 15). The closed contact 244*a* in combination with the closed switch 247 bypass the open contact 128*a*. This results in the application of operating power to the reversible motor 119 which again raises the elevator 113. As the elevator 113 is moved, the indexing dowel pin 131 (FIG. 7) moves past and out of depressing engagement with the roller actuator 129 whereby contact 128*a* is closed and contact 128*b* is opened. The closing of contact 128*a* now provides another path for the continued application of operating power to the motor 119.

When contact 128*b* is opened, the locking path for the continued energization of the coil 244 is opened whereby the coil is deenergized and contact 244*a* is opened. Also, the timer 239 is deactivated and the "AMBER" lamp 243 is no longer illuminated. The residual hold of the coil 244 on the contact 244*a* provides sufficient delay in the opening of the contact, after the opening of contact 128*b*, which provides sufficient time for contact 128*a* to close and thereby provide a path for continued operating power for the motor 119 before the contact 244*a* opens.

As the elevator 113 rises, the indexing dowel pin 132 (FIG. 7) eventually engages the roller actuator 129 to facilitate the opening of the switch 128*a*, which stops the motor 119, and the closing of contact 128*b*. At this time, the elevator 113 is in position to locate the second layer of connectors 31 in alignment with the plane of the upper surface of the forward inclined plate 57 (FIGS. 2 and 7). The first row of connectors 31 of the second layer moves from the box 67 and into the trailing station of the escapement enclosure 140 behind the last row of the preceding layer which is at the leading station of the enclosure. The second, third and fourth rows of connectors 31 move toward the escapement enclosure 140 but remain in the box 67. The assembly and securing cycle then proceeds as described before with respect to the top layer of connectors 31.

Frequently, the operator may observe when the fourth row of the first three layers of the connectors is located at the trailing station of the escapement enclosure 140. At this time, there are no connectors 31 remaining in the box 67 at that particular layer. The operator could proceed to raise the elevator 113 to position the next layer of connectors to follow directly behind the preceding layer rather than waiting until the missing-connector switch 238 is closed.

In order to provide for this efficient procedure, the electrical control system 226 includes a "SAFE" switch 248 which can be manually closed by the operator. After the thin layer of cardboard 80 is removed from atop the next layer of the connectors 31, the switch 248 is momentarily closed and the coil 244 is energized to close contact 244*a*. The switch 248 can then be opened since the contact 244*a* is now closed through the locking path. Since the elevator 113 is located at a position to feed connectors 31 into the apparatus 51, the contact 128*b* has been in the closed condition. This results in the flickering of the "AMBER" lamp 243 to indicate that contact 244*a* is now closed. The operator then closes the "RAISE" switch 247 to initiate the operation of the motor 119, in the same manner as described before, to raise the elevator 113. The electrical control system 226 then functions as described before to position the next layer of connectors 31 for feeding to the apparatus 51. At this time, the first row of connectors 31 of the just-positioned layer moves slightly toward the escapement enclosure 140 and into engagement with the connectors of the last row of the preceding layer which are located at the trailing station of the enclosure.

Use of the procedure expedites the processing of connectors 31 through the apparatus 51 in a highly efficient manner.

When the elevator 113 is in position for feeding the last, or bottom, layer of connectors 31 into the apparatus 51, the operator can lower the elevator after the last row of connectors has moved into the trailing station of the escapement enclosure 140. This is accomplished by first moving the "UP-DOWN" switch 231 to the "down" position whereby contact 231*a* is opened and contact 231*b* is closed. Since the elevator 113 is not in the bottom position, the contact 127*a* is in the closed condition. Consequently, the motor 119 operates to lower the elevator 113. The operator can then remove the empty box 67 and box support 79 and place a full box and box support on the elevator 113.

The operator then positions the "UP-DOWN" switch 231 to the "up" position and the motor 119 is operated to raise the elevator 113. The indexing dowel pin 131 then engages the roller actuator 129 to open the contact 128*a* whereby the motor stops. At this time, the top layer of connectors 31 is now in position to move in behind the last row of connectors of the bottom layer of the previous box 67 which is located in the escapement enclosure 140.

The upper limit switch 126 (FIG. 7) is positioned to engage the elevator 113 if the elevator is moved beyond the unloading level for the last layer of connectors 31. For example, after the last row of connectors 31 of the bottom layer has been fed from the box 67, the operator could mistakenly operate the electrical control system 226 to raise the elevator 113 in the normal manner as described before. Ultimately, the upper limit switch 126 is engaged and contact 126a is opened to stop the motor 119 and contact 126b is closed to facilitate illumination of a "BLUE" lamp 249. Illumination of the "BLUE" lamp 249 indicates to the operator that the elevator 113 has travelled to the upper limit and should be lowered to the bottom position. This can be done by moving the "UP-DOWN" switch 231 to the "down" position as described before.

An efficient and cost-saving procedure of assembling connectors 31 with the back plate 32 is accomplished by use of the methods and apparatus 51 as described hereinabove. The techniques as described permit essentially continuous flow of the connectors 31 into assembly with successive back plates 32 and the simultaneous securing of a plurality of the connectors with each back plate.

It is to be understood that the above-described embodiments are simply illustrative of this invention. Other embodiments may be devised by those skilled in the art which will embody the principles of the invention and fall within the spirit and scope thereof.

I claim:

1. A method of assembling a connector with a support plate where the connector includes a first end and a second end; and the support plate includes a connector-receiving opening, a fixed connector-securing clasp on one side of the plate adjacent to a first edge of the opening and a bendable connector-securing clasp on the same side of the plate adjacent to a second edge of the opening opposite to and spaced from the first edge thereof, which comprises the steps of:

moving a connector-receiving nest at least partially through the opening in the support plate to the side of the plate which includes the clasps with the fixed clasp located at one end of the nest;

feeding the connector into the nest with the first end of the connector extending from one end of the nest and into the fixed clasp and the second end of the connector extending from the opposite end of the nest;

moving the nest back through the opening of the plate to position the connector partially into the opening and the second end of the connector adjacent to the bendable clasp of the plate; and bending the bendable clasp over the second end of the connector to secure the connector with the support plate.

2. A method of assembling a plurality of connectors with a support plate where each connector includes a first end and a second end; and the support plate includes a connector-receiving opening, a plurality of fixed connector-securing clasps on one side of the plate adjacent to a first edge of the opening and a plurality of bendable connector-securing clasps on the same side of the plate adjacent to a second edge of the opening opposite to and spaced from the first edge thereof, which comprises the steps of:

moving a plurality of connector-receiving nests through the opening in the support plate to the side of the plate which includes the clasps with the fixed clasps located at a common end of the plurality of nests, the plurality of nests corresponding in number to the plurality of connectors, feeding the plurality of connectors into the plurality of nests with each connector being fed into a respective one of the nests, moving the plurality of connectors further within the respective nests to position the first end of each connector into the fixed clasp adjacent the respective nest, the second end of each connector extending from the opposite end of the respective nest, moving the plurality of nests through the opening of the plate whereby the extended second ends of the connectors engage a portion of the plate adjacent to the bendable clasps and are precluded from passing through the opening, and bending the bendable clasps over respective ones of the second ends of the plurality of connectors to secure the connectors with the support plate.

3. The method as set forth in claim 2 which further comprises the step of arranging the plurality of connectors in a spaced arrangement in alignment with a spaced arrangement of the plurality of nests prior to the feeding of the connectors into the nests.

4. The method as set forth in claim 2 wherein each nest is spaced from the adjacent nests by a predetermined distance and which, prior to the feeding of the connectors into the nests, further comprises the steps of:

positioning the plurality of connectors in a first side-by-side arrangement wherein each connector is spaced from the adjacent connectors by a distance less than the predetermined distance, and moving the plurality of connectors through an array of diverging tracks to spread the connectors apart and into alignment with the respective nests.

5. The method as set forth in claim 4, wherein each connector is provided with two parallel rows of terminals extending from one surface thereof and each diverging track includes a contoured plate, which further comprises the steps of:

positioning the rows of terminals of each connector on opposite sides of the respective contoured plate prior to moving the connectors through the tracks so that the connectors follow the contour of the plte when moved through the tracks.

6. The method as set forth in claim 2 wherein the step of feeding the plurality of connectors includes the step of:

positioning the plurality of connectors on an inclined surface so that the connectors slide by gravitation downwardly over the inclined surface; and the step of moving the plurality of connector-receiving nests includes the step of:

positioning the nests in inclined alignment with and at a lower end of the inclined surface to receive the connectors as they slide downwardly from the surface.

7. A method of assembling a selected number of a plurality of connectors with each of at least two support plates where each connector includes a first end and a second end; and each support plate includes a connector-receiving opening, a plurality of fixed connector-securing clasps on one side of the plate adjacent to a first edge of the opening and a plurality of bendable connector-securing clasps on the same side of the plate adjacent to a second edge of the opening opposite to and spaced from the first edge thereof, which comprises the steps of:

arranging the plurality of connectors into first and second rows with each row containing the selected number of connectors;

positioning a first of the support plates in a location for assembly of the connectors with the support plates, arranging the first and second rows of connectors in successive alignment in preparation for movement toward the location of assembly with the support plates, moving a plurality of connector-receiving nests through the opening in the first support plate to the side of the plate which includes the clasps with the fixed clasps located at a common end of the nests, the plurality of nests corresponding in number to the selected number of connectors holding the second row of connectors to preclude movement thereof, feeding each of the connectors of the first row into a respective one of the plurality of nests with the first end of each connector being fed into the fixed clasp adjacent to the respective nest and the second and extending from the respective nest, moving the plurality of nests through the opening of the first plate whereby the extended second ends of the connectors engage a portion of the plate adjacent to the bendable clasps and are precluded from moving through the opening, bending the bendable clasps over the second ends of the connectors of the first row to secure the connectors with the first support plate, removing the first support plate and the assembled and secured first row of connectors from the assemblylocation and placing the second support plate therein, moving the nests through the opening of the second support plate in position to receive the second row of connectors, releasing the second row of connectors for movement toward the assembly location, and repeating the steps of:

(1) feeding the second row of connectors into the nests, (2) moving the nests through the openings of the second support plate and (3) bending the bendable clasps over the second ends of the connectors.

8. An apparatus for assembling a connector with a support plate where the connector includes a first end and a second end; and the support plate includes a connector-receiving opening, a fixed connector-securing clasp on one side of the plate adjacent to a first edge of the opening and a bendable connector-securing clasp on the same side of the plate adjacent to a second edge of the opening opposite to and spaced from the first edge thereof, which comprises:

a connector-receiving nest positionable on the side of the support plate which includes the clasps with the fixed clasp located at one end of the nest;

means for moving the connector into the nest with the first end of the connector extending from one end of the nest and into the fixed clasp and the second end extending from the opposite end of the nest;

means for moving the nest through the plate opening to position the connector partially into the opening and the second end of the connector adjacent to the bendable clasp of the plate; and means for bending the bendable clasp over the second end of the connector to secure the connector with the support plate.

9. An apparatus for assembling a plurality of connectors with a support plate where each connector includes a first end and a second end; and the support plate includes a connector-receiving opening, a plurality of fixed connector-securing clasps on one side of the plate adjacent to a first edge of the opening and a plurality of bendable connector-securing clasps on the same side of the plate adjacent to a second edge of the opening opposite to and spaced from the first edge thereof, which comprises:

means for supporting the support plate at an assembly location, a plurality of connector-receiving nests, corresponding in number to the plurality of connectors, means for moving the plurality of connector-receiving nests through the opening in the support plate to the side of the plate which includes the clasps with the fixed clasps located at a common end of the plurality of nests, means for feeding each of the plurality of connectors into a respective one of the plurality of nests and for feeding the first end of each connector into the fixed clasp adjacent to the respective nest with the second end of each connector extending from the opposite end of the respective nest, means for moving the plurality of nests through the opening of the plate whereby the extended second ends of the connectors engage a portion of the plate adjacent to the bendable clasps and are precluded from passing through the opening, and bending the bendable clasps over respective ones of the second ends of the plurality of connectors to secure the connectors with the support plate.

10. The apparatus as set forth in claim 8 wherein each nest is spaced from the adjacent nests by a predetermined distance and which further comprises:

means for receiving the plurality of connectors in a first side-by-side arrangement prior to feeding the connectors into the nests wherein each connector is spaced from the adjacent connectors by a distance less than the predetermined distance, and means for moving the plurality of connectors apart and into alignment with the respective nests.

11. The apparatus as set forth in claim 9 wherein the means for moving the connectors apart includes a plurality of tracks having an entry-end spacing equal to the spacing of the first side-by-side arrangement of the connectors and an exit-end spacing equal to the predetermined-distance spacing of the nests which facilitates diverging separation of the connectors moving through the tracks.

12. The apparatus as set forth in claim 10 wherein each connector is provided with two parallel rows of terminals extending from one surface thereof and each of the plurality of tracks includes a contoured plate which is positioned to have one of the rows of terminals of the respective connector located on one side thereof and the other row located on the other side thereof prior to moving the connectors through the tracks so that the connectors follow the contours of the plates when moved through the tracks, the contours of the plates being designed to receive the connectors at an entry end of the tracks in the spacing of the first side-by-side arrangement and moving the connectors divergingly apart to the predetermined-distance spacing at an exit end of the tracks.

13. An apparatus for assembling a selected number of a plurality of connectors with each of at least two support plates where each connector includes a first end and a second end; and each support plate includes a connector-receiving opening, a plurality of fixed connector-securing clasps on one side of the plate adjacent to a first edge of the opening and a plurality of bendable connector-securing clasps on the same side of the plate adjacent to a second edge of the opening opposite to and spaced from the first edge thereof, which comprises:

means for supporting the plurality of connectors in first and second rows with each row containing the selected number of connectors, means for supporting a first of the support plates in a location for assembly of the conectors with the support plates, means for receiving and containing the first and second rows of connectors in successive alignment in preparation for movement toward the location of assembly with the support plates, a plurality of connector-receiving nests, means for moving the plurality of connector-receiving nests through the opening in the first support plate to the side of the plate which includes the clasps with the fixed clasps located at a common end of the nests, the plurality of nests corresponding in number to the selected number of connectors, means for holding the second row of connectors to preclude movement thereof, means for feeding each of the connectors of the first row from the receiving and retaining means into a respective one of the plurality of nests with the first end of each connector being fed into the fixed clasp adjacent to the respective nest and the second and extending from the respective nest, means for moving the plurality of nests through the opening of the first plate whereby the extended second ends of the connectors engage a portion of the plate adjacent to the bendable clasps and are precluded from moving through the opening, means for bending the bendable clasps over the secondends of the connectors of the first row to secure the connectors with the first support plate, and means for releasing the second row of connectors for movement toward the assembly location after the first support plate has been removed from the assembly location, a second plate positioned therein and the connector-receiving nests moved through the plate opening.

14. An apparatus for assembling a selected number of a plurality of connectors with each of a plurality of support plates where each connector includes a first end and a second end; and each support includes a connector-receiving opening, a plurality of fixed connector-securing clasps on one side of the plate adjacent to a first edge of the opening and a plurality of bendable connector-securing clasps on the same side of the plate adjacent to a second edge of the opening opposite to and spaced from the first edge thereof, which comprises:

a support having an inclined surface with an upper end and a lower end;

an indexable elevator for supporting a supply container of layers of rows of the plurality of connectors with each row containing the selected number of connectors;

means for controlling the elevator to position successive layers of the connectors adjacent to and in alignment with the upper end of the inclined surface to permit each layer of connectors to move, by gravity, from the supply container and onto the surface for feeding the connectors, by gravity, from the upper end to the lower end of the inclined surface;

a table located adjacent to the lower end of the inclined surface for supporting, one at a time, successively positioned support plates; the table having openings in position to be aligned with the opening in the support plate;

a plurality of connector-receiving nests located below the table and insertable through the openings of the table and the support plate;

means for moving the nests through the opening of the table and support plate and into angular alignment with and adjacent to the lower end of the inclined surface; and means for controlling the feeding, by gravity, of successive rows of connectors of each layer over the inclined surface to permit a single row of connectors to be assembled with each support plate.

15. The apparatus as set forth in claim 14 wherein the means for controlling the feeding of the connectors includes:

an enclosure mounted on the inclined surface at the upper end thereof for receiving two rows of connectors exiting from the supply container;

an escapement member having a stop portion thereof projectable into the path of the first row of the two rows of connectors to preclude all rows of connectors from being fed further over the inclined surface;

means for clamping the second row of the two rows of connectors within the enclosure to preclude further movement of the second row and any subsequent row over the inclined surface; and means for controlling the escapement member and the clamping means to clamp the second row of connectors within the enclosure and retract the stop portion of the escapement member to permit the feeding, by gravity, of the first row of connectors over the inclined surface.

16. The apparatus as set forth in claim 14 wherein each of the nests are spaced from the adjacent nests by a predetermined spacing and each connector of each row is spaced from the adjacent connectors of the same row in a supply-container spacing by a distance less than the predetermined distance, and which further comprises:

a plurality of tracks mounted on the inclined surface in a diverging arrangement to receive each row of connectors in the supply-container spacing and guide the connectors over the inclined surface while moving the connectors apart and into the predetermined spacing at the lower end of the inclined surface.

* * * * *